(12) United States Patent
Ohga et al.

(10) Patent No.: US 7,486,862 B2
(45) Date of Patent: Feb. 3, 2009

(54) OPTICAL FIBER AND MANUFACTURING METHOD THEREOF

(75) Inventors: Yuichi Ohga, Yokohama (JP); Masashi Onishi, Yokohama (JP); Osamu Kasuu, Yokohama (JP); Shuichiro Kato, Yokohama (JP); Toru Adachi, Yokohama (JP); Takashi Sasaki, Yokohama (JP); Masaaki Hirano, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 207 days.

(21) Appl. No.: 10/556,946

(22) PCT Filed: May 18, 2004

(86) PCT No.: PCT/JP2004/007039

§ 371 (c)(1),
(2), (4) Date: Jul. 27, 2006

(87) PCT Pub. No.: WO2004/101456

PCT Pub. Date: Nov. 25, 2004

(65) Prior Publication Data

US 2008/0107385 A1    May 8, 2008

(30) Foreign Application Priority Data

May 19, 2003    (JP) .............................. 2003-139732
May 19, 2003    (JP) .............................. 2003-139733

(51) Int. Cl.
*G02B 6/02*     (2006.01)
*C03B 37/023*   (2006.01)

(52) U.S. Cl. ....................... 385/123; 385/124; 385/141; 65/385; 65/393; 65/412; 65/419; 65/422; 65/426; 65/428

(58) Field of Classification Search ................. 385/123, 385/124, 125, 126, 127, 128, 141, 142, 144; 65/385, 393, 412, 419, 422, 426, 428
See application file for complete search history.

(56) References Cited

U.S. PATENT DOCUMENTS 4,668,263 A    5/1987   Yokota et al.

(Continued)

FOREIGN PATENT DOCUMENTS

EP    0 182 250    5/1986

(Continued)

OTHER PUBLICATIONS

Chinese Office Action, issued in corresponding Chinese Patent Application No. 200480013577.0, dated on Jul. 7, 2007.

*Primary Examiner*—Brian M Healy
(74) *Attorney, Agent, or Firm*—McDermott Will & Emery LLP

(57) ABSTRACT

A core rod is inserted into a cladding pipe, moisture in a space between the core rod and the cladding pipe is removed, and an optical fiber is drawn while the space is connected to a dry-gas atmosphere and/or being decompressed and while the core rod and the cladding pipe are being unified with each other. Alternatively, the core rod is inserted into the cladding pipe, and an optical fiber is drawn from one end while moisture on the surface of the core rod and the internal surface of the cladding pipe is being removed. Accordingly, a high quality optical fiber is manufactured with good productivity.

17 Claims, 23 Drawing Sheets

U.S. PATENT DOCUMENTS

| | | | |
|---|---|---|---|
| 4,772,303 A | 9/1988 | Kamiya et al. | |
| 4,846,867 A * | 7/1989 | Yokota et al. | 65/397 |
| 5,837,334 A | 11/1998 | Yokokawa et al. | |
| 6,189,342 B1 * | 2/2001 | Berkey | 65/412 |
| 6,253,580 B1 * | 7/2001 | Gouskov et al. | 65/391 |
| 6,584,808 B1 | 7/2003 | Roba et al. | |
| 2002/0134113 A1 * | 9/2002 | Berkey | 65/397 |
| 2003/0140659 A1 | 7/2003 | Fabian | |
| 2005/0172676 A1 | 8/2005 | Roselieb et al. | |

FOREIGN PATENT DOCUMENTS

| | | |
|---|---|---|
| JP | 41-011071 | 6/1941 |
| JP | 61-117126 | 6/1986 |
| JP | 62-3034 | 1/1987 |
| JP | 7-109141 | 4/1995 |
| JP | 2000-233937 | 8/2000 |
| JP | 2001-220164 | 8/2001 |
| JP | 2002-501871 | 1/2002 |
| JP | 2003-048737 | 2/2003 |
| JP | 2003-112936 | 4/2003 |
| WO | WO 98/43921 | 10/1998 |
| WO | WO 01/90010 A1 | 11/2001 |
| WO | WO 03/080522 A1 | 10/2003 |
| WO | WO 03/104154 A1 | 12/2003 |

* cited by examiner

OPTICAL FIBER AND MANUFACTURING METHOD THEREOF

RELATED APPLICATION

This application is a national phase of PCT/JP2004/007039 filed on May 18, 2004, which claims priority from Japanese Application No. 2003-139732 and Japanese Application No. 2003-139733 both of which were filed on May 19, 2003, the disclosures of which Applications are incorporated by reference herein. The benefit of the filing and priority dates of the international and Japanese Applications is respectfully requested.

TECHNICAL FIELD

The present invention relates to manufacturing methods of an optical fiber and an optical fiber.

BACKGROUND ART

A method of manufacturing an optical fiber has been disclosed in Japanese Unexamined Patent Application Publication No. 2000-233937, WO03/080522, or WO01/90010, the optical fiber being formed by inserting a columnar core glass inside a cylindrical cladding glass, followed by heating and drawing.

In the method disclosed in Japanese Unexamined Patent Application Publication No. 2000-233937, the ratio of the external diameter of the cladding is glass to the diameter of the core glass is set to 10 or more, and the dimensional error of the diameter of the core glass and that of the internal diameter of the cladding glass are each set to 5 µm or less.

In the method disclosed in WO03/080522, a core rod is coaxially disposed in a quartz glass tube having an external diameter of 100 mm or more, which is a final dimension obtained by machining, and while a space formed between the glass tube and the core rod is being collapsed, an optical fiber is drawn from the bottom end thereof.

In the method disclosed in WO01/90010, an optical fiber is produced by drawing a core rod and a cladding pipe which are coaxially disposed, wherein the cladding pipe has OH concentration of maximum 1 wt. ppm and the core rod has an optical cladding glass layer around a core glass layer, the ratio of the external diameter of the optical cladding glass layer to the diameter of the core glass layer being between 1 and 2.2, the core rod having an OH concentration of maximum 1 wt. ppm in an area close to the surface, to a depth of up to 10 µm.

A method in which a preform rod and a glass tube are sealed at one end thereof, a vacuum pump is connected to the other end, and the space formed between the preform rod and the glass tube is evacuated while the glass tube is heated so that the preform rod is overcladded with the glass tube whereby an optical fiber preform is produced, or the glass tube is collapsed on the preform rod whereby an optical fiber is drown has been disclosed in WO98/43921.

A method of obtaining an optical fiber has been disclosed in Japanese Unexamined Patent Application Publication No. 62-3034 in which a synthetic glass having a higher refractive index than that of a quartz tube is deposited inside the quartz tube, followed by drawing thereof. In the method disclosed in Japanese Unexamined Patent Application Publication No. 62-3034, one end of the quartz tube is closed, a gas in the quartz tube is then evacuated from the other end thereof for drying while the quartz tube is being heated, and subsequently, the quartz tube is filled with a halogen gas or a halogenated gas containing no hydrogen, followed by drawing for forming the optical fiber.

A method of manufacturing a large quartz glass preform has been disclosed in Japanese Unexamined Patent Application Publication No. 7-109141 in which a large quartz glass tube and a core glass rod for an optical fiber are unified together by a rod-in-tube method, the core glass rod being composed of a core portion and a part of a cladding portion, whichever transmits light (an optical cladding portion). In the method disclosed in Japanese Unexamined Patent Application Publication No. 7-109141, the large quartz glass tube has an external diameter of 50 to 300 mm, a ratio of the external diameter to the internal diameter of 1.1 to 7, a thickness of 10 mm or more, a thickness error of 2% or less, and an internal surface roughness of 20 µm or less. In addition, according to Japanese Unexamined Patent Application Publication No. 7-109141, the external diameter of the optical cladding portion must be at least 2 times the diameter of the core portion.

PCT Japanese Patent Application Translation Publication No. Tokuhyo 2002-501871 discloses a method of manufacturing an optical fiber preform. In the method, a rod is placed in a tube so as to form a circular space between the rod and the tube, one end of the tube is collapsed, the circular space is evacuated, and the other end is collapsed to form an optical fiber preform.

In general, a considerable part of light transmitted in an optical fiber penetrates into an optical cladding portion, and impurities and imperfection existing at the interface between the core and the cladding and at the optical cladding portion increase the loss of transmitting light, decrease the mechanical strength of the optical fiber, or the like, thus, seriously affecting the properties of the optical fiber. Accordingly, in general, a portion (core portion) corresponding to the core of an optical fiber is not separately formed. In particular, when a single mode optical fiber is manufactured, after a core portion and a predetermined amount of an optical cladding portion provided around the core portion are simultaneously formed so that the ratio of the diameter of the optical cladding portion to that of the core portion is 3 to 5, a remaining cladding portion is further formed therearound. Thus, the manufacturing is accomplished such that the properties of the produced optical fiber are not adversely affected even when impurities and imperfection exist in the interface between the optical cladding and the cladding provided therearound and the vicinity thereof.

In general, a refractive index profile of the core portion of the optical fiber must accurately be controlled, and hence the synthesis thereof is cost-consuming and time-consuming as compared to that of the cladding portion. However, in the case in which the core portion and the optical cladding portion are simultaneously formed as described above, the optical cladding portion can be manufactured at only a cost approximately equivalent to that of the core.

DISCLOSURE OF INVENTION

An object of the present invention is to provide an optical fiber having a structure capable of achieving low loss and superior productivity and to provide a manufacturing method thereof.

To these ends, there is provided a method of manufacturing an optical fiber formed by inserting a core rod into a cladding pipe, followed by a fiber-drawing step while the core rod and the cladding pipe are being unified by heating. This manufacturing method comprises the steps of: inserting a core rod into a cladding pipe; removing moisture present on the surface of the core rod and the internal surface of the cladding pipe;

closing at least one end of the cladding pipe; and drawing from the one end so as to form an optical fiber in a state where a space formed between the core rod and the cladding pipe is connected to a dry-gas atmosphere and/or is decompressed.

In the present specification, the "core rod" is not limited to what constitutes a portion corresponding to a core of an optical fiber (core portion) but includes what constitutes a core portion and a part of a cladding portion (hereinafter referred to as first cladding portion), the part surrounding the core portion and having a refractive index smaller than that of the core portion.

In the step of removing moisture, the core rod and the cladding pipe may be heated while the space is being connected to a dry-gas atmosphere and/or is being decompressed. The step of removing moisture may comprise: a first sub step of heating the core rod and the cladding pipe while the space is connected to a dry-gas atmosphere and/or is being decompressed; and a second sub step of heating the core rod and the cladding pipe while the space is maintained in a dry-gas atmosphere containing a halogen gas or a halogenated gas. The step of closing at least one end of the cladding pipe may be that of closing one end of the cladding pipe and further closing the other end of the cladding pipe while the space is being decompressed.

There is provided another method of manufacturing an optical fiber, which method includes a step of inserting a core rod into a cladding pipe and a step of fiber-drawing performed while the core rod and the cladding pipe are being unified by heating. This manufacturing method comprises the steps of: inserting a core rod into a cladding pipe; closing at least one end of the cladding pipe; and drawing from the one end so as to form an optical fiber while moisture adhering on the surface of the core rod and the internal surface of the cladding pipe is being removed by heating the core rod and the cladding pipe in a state where a space between the core rod and the cladding pipe is connected to a dry-gas atmosphere. In the step of closing at least one end of the cladding pipe, the space may be connected to a dry-gas atmosphere and may also be decompressed, and in addition, a step of unifying the core rod and the cladding pipe with each other at said one end may also be included.

In either manufacturing methods, a step of connecting a supporting member to an end of the core rod may be further included, and the step of closing at least one end of the cladding pipe may include a step of unifying the supporting member and the cladding pipe together at the one end. A step of connecting a supporting pipe to an end of the cladding pipe may be further included, and the step of closing at least one end of the cladding pipe may be performed by unifying the core rod and the supporting pipe with each other. A step of connecting a supporting member to an end of the core rod and a step of connecting a supporting pipe to an end of the cladding pipe may be further included, and the step of closing at least one end of the cladding pipe may be performed by unifying the supporting member and the supporting pipe with each other.

The concentration of hydrogen molecules or a compound containing a hydrogen atom in the dry gas may be 10 volume ppm or less in total. A step of heating the cladding pipe may be further included before the insertion step.

A ratio D/d of a diameter D of the core rod to a diameter d of a core portion may be in the range of one to less than 2. The core rod may be only formed of the core portion, and in this case, the relative refractive index difference of the core rod to the cladding pipe is preferably 0.2% or more. In addition, the core rod may be formed of the core portion and the first cladding portion. In this case, the relative refractive index difference of the core portion to the first cladding portion is preferably 0.2% or more, and the refractive index of the first cladding portion is preferably substantially equivalent to the refractive index of a part of the cladding pipe in the region from the internal surface thereof to a depth of one-tenth of the thickness of the cladding pipe.

A ratio D2/d2 of an external diameter D2 of the cladding pipe to an internal diameter d2 thereof may be in the range of 5 to 30, and the length of the cladding pipe may be 500 mm or more. The ratio D2/d2 is more desirably in the range of more than 7 to 30.

The eccentricity of the internal circumference of the cladding pipe to the external circumference thereof may be 0.3% or less over the entire length of a portion (effective portion) to be formed into a product. The average viscosity of the core rod at 1,200° C. may be equivalent to or more than the average viscosity of the cladding pipe.

In addition, provided is an optical fiber which has a core and a cladding provided around the external circumference thereof and having a refractive index smaller than that of the core, and in which only one boundary is formed on a cross-section perpendicular to the axis thereof as a result of a rod and a pipe having been unified together by heating, and in which the light transmission loss at a wavelength of 1.38 μm is 0.5 dB/km or less.

A ratio p1/r1 of a distance p1 between the center of the core and the boundary to a radius r1 of the core may be in the range of 1 to less than 2. The relative refractive index difference of the core to a first cladding which is a portion from the boundary to the core may be 0.2% or more, and when the thickness of the first cladding is represented by t, the refractive index of the first cladding may be substantially equivalent to the refractive index of a portion between the boundary and a circle which has a radius of r1+2t and which is concentric to the center of the core. The average viscosity of the core at 1,200° C. may be equivalent to or more than the average viscosity of the cladding. The core may be made of a pure silica glass or a silica glass containing an additive, and the cladding may be made of a glass primarily composed of a fluorine-containing silica glass.

BRIEF DESCRIPTION OF THE DRAWINGS

The present invention, hereinafter, will be described in detail with reference to figures. The figures are shown for purposes of illustration only and are not intended to limit the scope of the present invention.

BEST MODE FOR CARRYING OUT THE INVENTION

Figure 1:
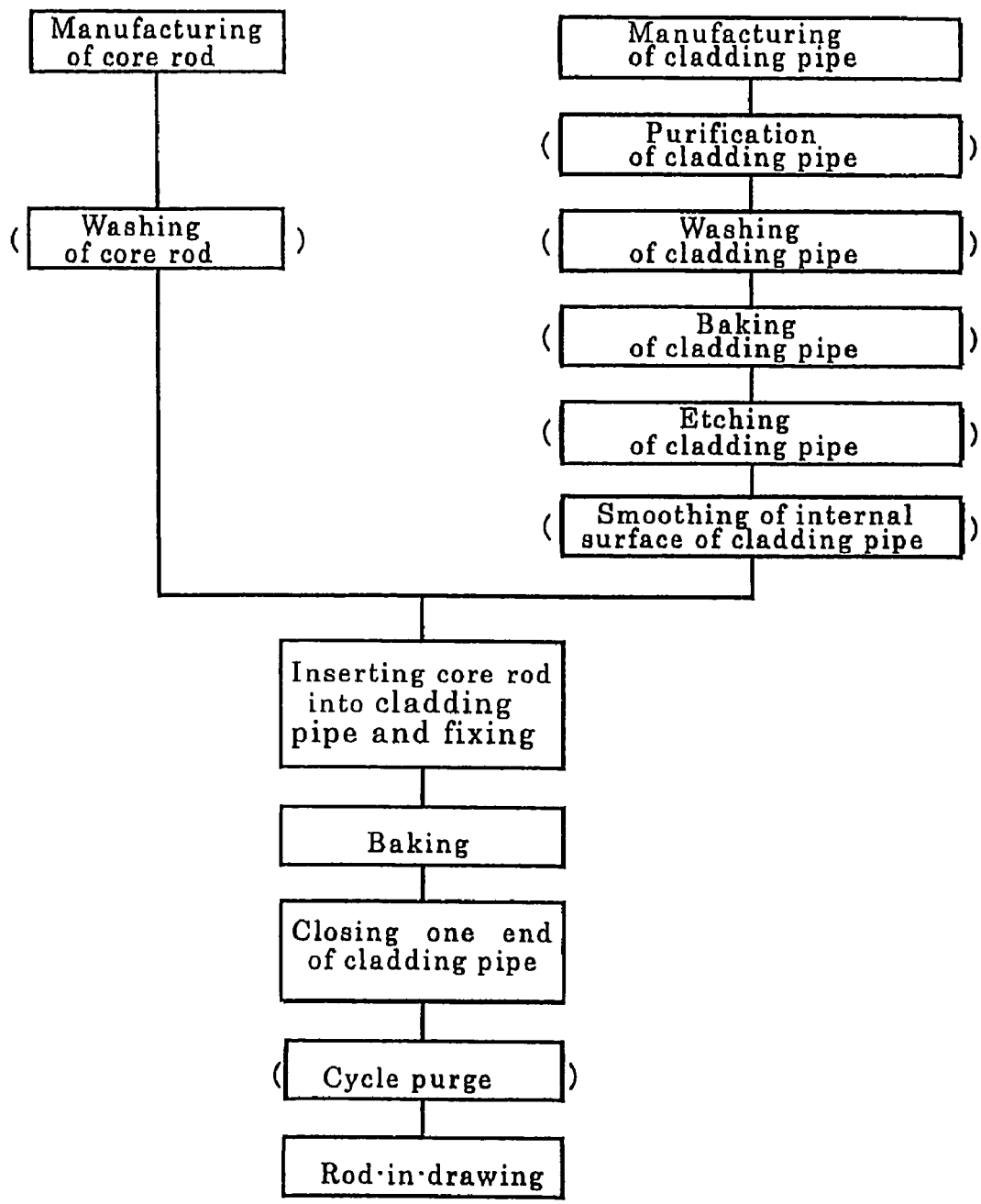
FIG. 1 is a flowchart showing a first embodiment of the present invention.

Hereinafter, embodiments of the present invention will be described with reference to figures. In the figures, in order to avoid duplication of description, the same reference numeral indicates the same portion. The scale ratios shown in the figures are not always accurate.

A process in which a core rod is inserted into a cladding pipe and then they are unified by heating is hereinafter called rod-in-collapse. A process in which fiber-drawing is performed while a cladding pipe and a core rod inserted therein are being unified together by heating is hereinafter called rod-in-drawing.

When rod-in-drawing is performed in a process of manufacturing an optical fiber, an interface (hereinafter referred to as "rod-in-interface" in some cases) is formed as a result of the unification of the rod and the pipe by heating. When the face of a cross-section cut perpendicularly relative to the axis of an optical fiber is subjected to chemical etching by immersion in a hydrofluoric acid solution or a buffered hydrofluoric acid solution containing ammonium fluoride and the resultant face is observed using an electron microscope, the boundary appears as a step.

In a method of manufacturing an optical fiber, according to the present invention, a core rod is inserted into a cladding pipe, moisture present on the surface of the core rod and the internal surface of the cladding pipe is removed, at least one end of the cladding pipe is closed, and while a space formed between the core rod and the cladding pipe is being connected to a dry-gas atmosphere and/or is being decompressed, the core rod and the cladding pipe are heated. The core rod and the cladding pipe thus heated are softened and are unified together while the diameters thereof are being decreased, followed by fiber-drawing in that state.

By the steps as described above, impurities, in particular OH groups, or imperfection existing on the surface of the core rod and the internal surface of the cladding pipe, that is, existing in the vicinity of the interface therebetween, can be eliminated effectively. In addition, the intrusion of impurities, which may otherwise occur, can be suppressed when the core rod and the cladding pipe are unified together. Thus, an optical fiber having superior light transmission properties can be manufactured by rod-in-drawing according to the present invention as compared to those manufactured by conventional rod-in-drawing in the past. In addition, since most of the optical cladding or the entire optical cladding thereof is formed at one time and by a step independent of the step of the core synthesis, the reduction in manufacturing cost and in manufacturing time can be realized.

Since an external force is uniformly applied along a direction from the exterior circumferential portion of the pipe to the center of the internal diameter thereof as the diameter of the pipe is decreased in a drawing step, the decrease in diameter is performed fast and uniformly, and hence bubbles do not remain at the interface with the core rod, and the core and the cladding do not have a noncircular or an eccentric shape. Accordingly, even in the case of a large and thick cladding pipe, a superior optical fiber can be manufactured by rod-in-drawing using the cladding pipe mentioned above.

In addition, the optical fiber according to the present invention has: a core and a cladding which is provided therearound and which has a refractive index smaller than that of the core; only one boundary on the cross-section perpendicular to the axis of the optical fiber, which is formed when the rod and the pipe are unified together by heating; a light transmission loss of 0.5 dB/km or less at a wavelength of 1.38 µm; a low concentration of impurities, in particular, moisture, and low loss; and a structure having superior productivity.

Figure 2:
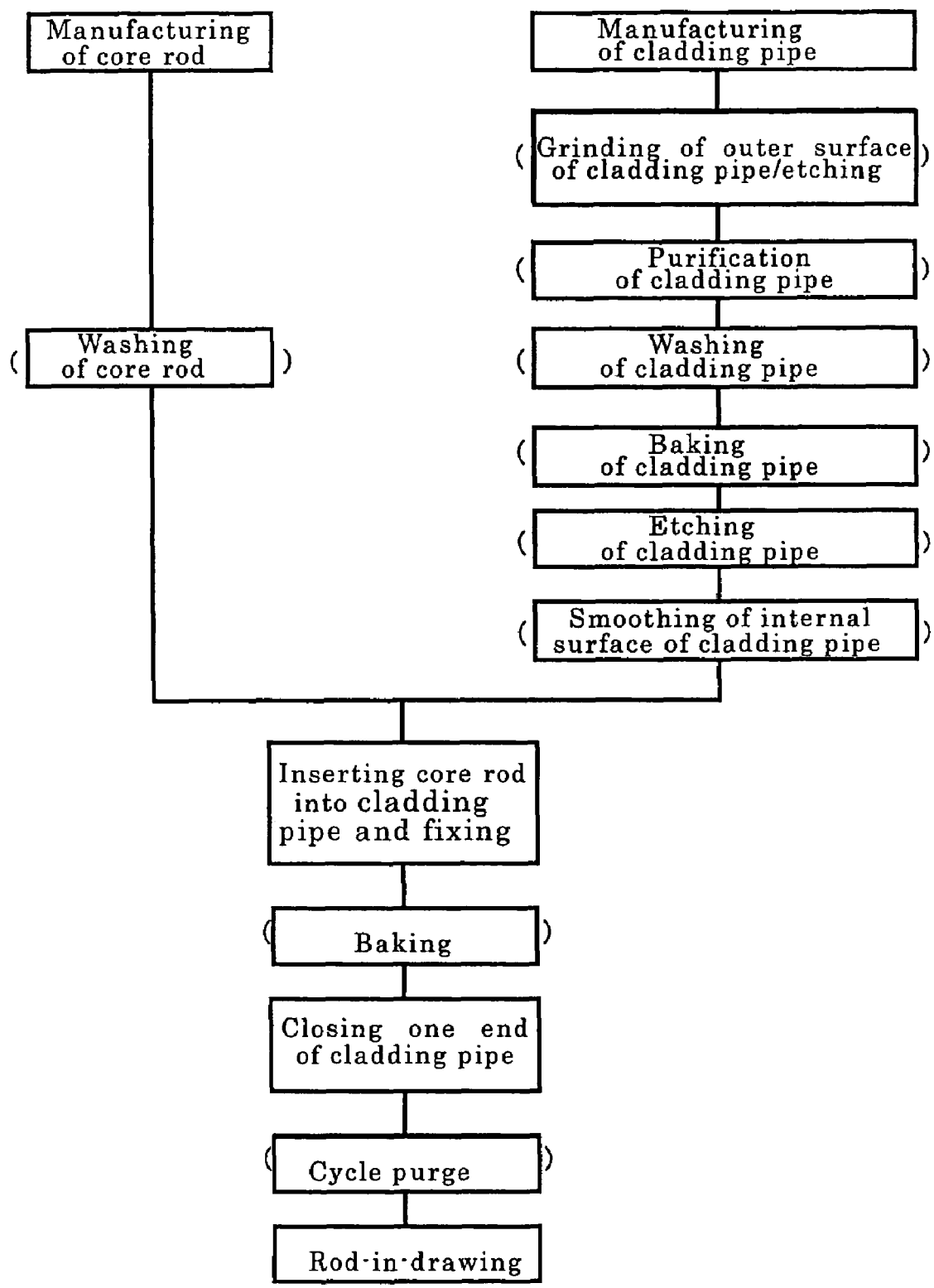
FIG. 2 is a flowchart showing a modified example of the first embodiment of the present invention.

The embodiments of the present invention will be described below. FIG. 1 is a flowchart showing a first embodiment of the present invention. FIG. 2 is a flowchart showing a modified example of the first embodiment of the present invention. Hereinafter, individual steps will be described primarily with reference to the example shown in FIG. 1.

In the first embodiment, a core rod and a cladding pipe which are separately manufactured are prepared. The core rod and the cladding pipe may be usable regardless of whether they are formed in-house or obtained from a third party. The steps in parentheses shown in FIGS. 1 and 2 may be omitted. Purification, washing, dehydration by heating, etching, smoothing of the cladding pipe and washing of the core rod are preferably performed as preprocessing steps for rod-in-drawing. Subsequently, the core rod is inserted into the cladding pipe and is fixed. In the following baking step, the surface of the core rod and the internal surface of the cladding pipe are dehydrated by heating. One end of the cladding pipe is closed. Subsequently, a space formed between the core rod and the cladding pipe is preferably subjected to cycle purge using a dry gas. Next, the cladding pipe is heated so as to decrease the diameter thereof, and while the cladding pipe and the core rod are being unified together, rod-in-drawing is performed from the portion thus unified to produce an optical fiber.

As shown in FIG. 2, in the preprocessing steps of the cladding pipe, whenever necessary, polishing or etching of the external surface of the cladding pipe may be performed in accordance with the internal diameter thereof so that a cladding pipe may have a predetermined external diameter and internal diameter. In addition, a supporting pipe is preferably connected to the cladding pipe so as to hold it.

<Manufacturing of Core Rod>

The core rod is manufactured by a VAD method. A core-synthesizing burner and a first cladding-synthesizing burner are used, and a glass raw material gas, a combustible gas, a combustion assisting gas, and, whenever necessary, an additive raw material gas are supplied to the individual burners so that glass fine particles are deposited on a bottom part of a starting rod in an axis direction, thereby manufacturing a glass particle-deposit body. The additive raw material gas is supplied as needed to either one or both of the core-synthesizing burner and the first cladding-synthesizing burner. The number of the glass-synthesizing burners to be used is determined by necessity. As described above, the glass particle-deposit body is manufactured by adjusting the combustible gas, the combustion assisting gas, the flow rate of the additive raw material gas, the amount of glass deposition, and the like so that a ratio D/d of a diameter (in this case, equivalent to the diameter of the core rod) D of a first cladding portion to a diameter d of a core portion, both of which are finally formed by vitrification, becomes a predetermined value in the range of more than 1 to less than 2 and so that a predetermined refractive index profile is obtained.

When a core rod only composed of the core portion is manufactured, without using the cladding-synthesizing burner, a glass raw material gas, a combustible gas, a combustion assisting gas and whenever necessary, an additive raw material gas are supplied to the core-synthesizing burner, and glass fine particles are deposited on a bottom part of a starting rod in an axis direction, thereby manufacturing a glass particle-deposit body. In this case, the ratio D/d of the diameter D of the core rod to the diameter d of the core portion is 1.

An OVD method is also applicable to manufacturing of the core rod. Glass particles to be formed into the core portion are first deposited around a starting rod. In case a core rod having the first cladding is to be manufactured, glass particles to be formed into the first cladding portion are deposited around the core portion. The amount of deposition of the core portion and that of the first cladding portion are adjusted so that the ratio D/d of the diameter (in this case, equivalent to the diameter of the core rod) D of the first cladding portion to the diameter d of the core portion, both of which are finally formed by vitrification, becomes a predetermined value in the range of more than 1 to less than 2. In the case of an OVD method, the starting rod is extracted from the glass particle-deposit body thus obtained.

In both cases described above, the obtained glass particle-deposit body is dehydrated and vitrified so that a core rod having no cladding around the core or a core rod having a very small cladding is manufactured. When the glass particle-deposit body is manufactured by an OVD method, a glass pipe obtained by vitrification is collapsed to be a solid rod by heating, or vitrification and collapse of the glass particle-deposit body are simultaneously carried out, in order to form a core rod. In addition to the VAD and the OVD methods described above, other known methods such as a sol-gel method, MCVD method, and PCVD method may be used alone or in combination to manufacture the core rod. The vitrified core rod is treated whenever necessary by a drawing process to have a predetermined diameter using known heating means such as a resistance heating furnace or an induction heating furnace. For example, drawing is performed to obtain a diameter of 3 to 30 mm.

<Manufacturing of Cladding Pipe>

By a VAD method or an OVD method, the cladding pipe can be manufactured. When a cladding pipe having a large external diameter is to be formed, a multi-burner multi-layer deposition method (MMD method) is preferable in which many burners are juxtaposed to form a burner line, and the burner line and a starting rod are relatively moved by a distance not more than several times the interval between the burners. By an OVD method including an MMD method, a glass particle-deposit body is manufactured by depositing glass particles around a starting rod. A cladding pipe is obtained by extracting the starting rod from the glass particle-deposit body thus obtained and subsequently performing dehydration and vitrification. Alternatively, the cladding pipe may be produced by extracting the starting rod after the glass particle-deposit body has been dehydrated and vitrified.

Figure 3:
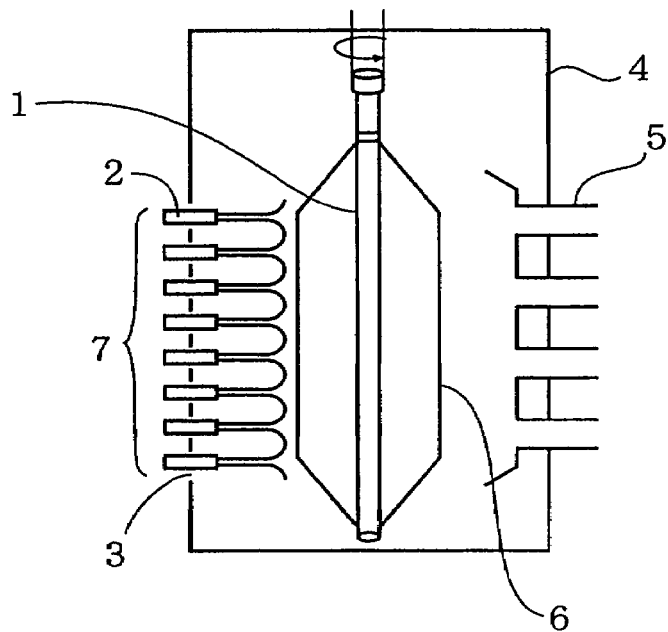
FIG. 3 is a view showing an example of an OVD method with a plurality of burners.

The MMD method will be described with reference to FIG. 3. In this method, glass particles are deposited such that only respective parts in a lengthwise direction of the glass particle-deposit body is formed with one corresponding burners and the parts constitute the entire glass particle-deposit body. A starting rod 1 is placed in a container 4, and a plurality of burners 2 are disposed to face the starting rod 1 such that a burner line 7 is formed. One of the starting rod 1 and the burner line 7 or both of them are moved, so that the starting rod 1 and the burner line 7 are relatively moved reciprocatingly. The distance of this reciprocating movement is determined to be approximately equivalent to the interval between the burners. In this embodiment, the interval between the burners indicates a distance between the centers of the burners. Glass particles supplied from the burners 2 are deposited on the starting rod 1, thereby forming a glass particle-deposit body 6. A glass raw material gas, a combustible gas, and a combustion assisting gas may be supplied to the burner so that glass particles are synthesized in the flame jetted from the burner. Alternatively, glass particles may be supplied to the burner and may then be jetted out thereof. A clean gas is supplied into the container through vents 3 provided in the vicinity of the burners, and a gas inside the container 4 is exhausted from exhaust ports 5 together with glass particles which are not deposited.

Figure 4:
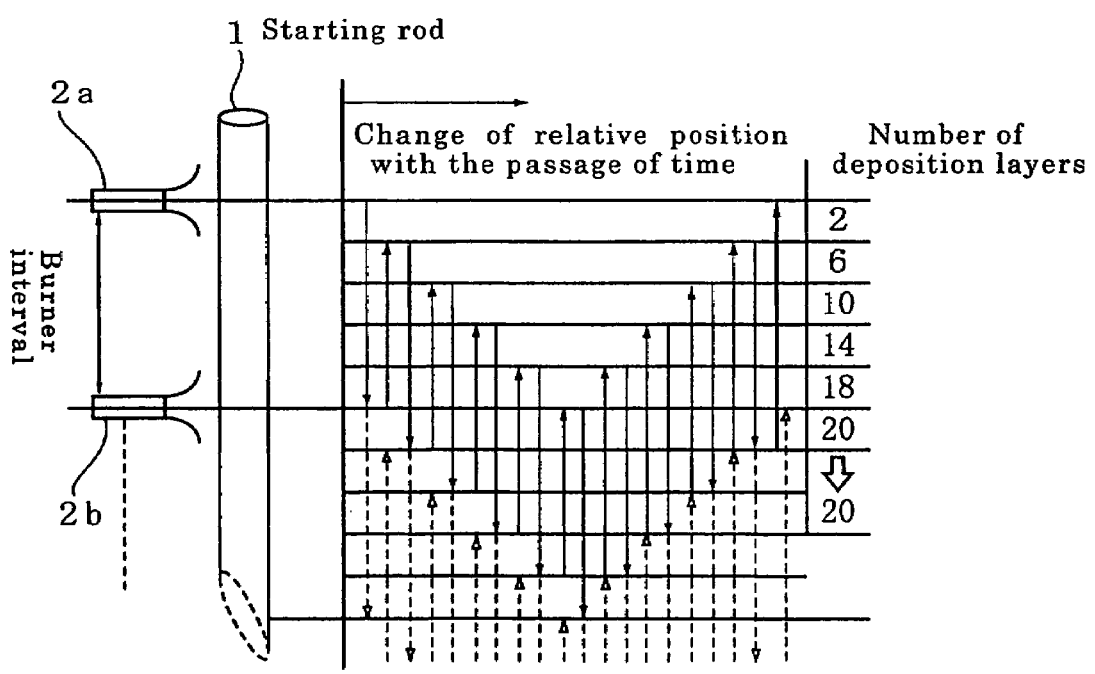
FIG. 4 is a view showing an example of U-turn points of burners of an OVD method with a plurality of burners.

In order to form the glass particle-deposit body 6 having a diameter uniform in the lengthwise direction, the U-turn points at which the reciprocating movement changes its direction are dispersed so as not to be located at the same point constantly. In FIG. 4, the movement (solid line) of a burner 2a located at an outermost position and the movement (dashed line) of a burner 2b located inside adjacent to the burner 2a are shown until the U-turn point of each burner returns to the original position, and the movements of the other burners are not illustrated. In FIG. 4, the U-turn points are shifted in a vertical direction by one-fifth of the interval between the burners per movement so as to be dispersedly located. The number of layers deposited on the both ends of the glass particle-deposit body varies, such as 2, 6, 10, 14, and 18 layers, depending on the position of a starting rod, and at the positions other than the two end portions, 20 layers are deposited.

Figure 5:
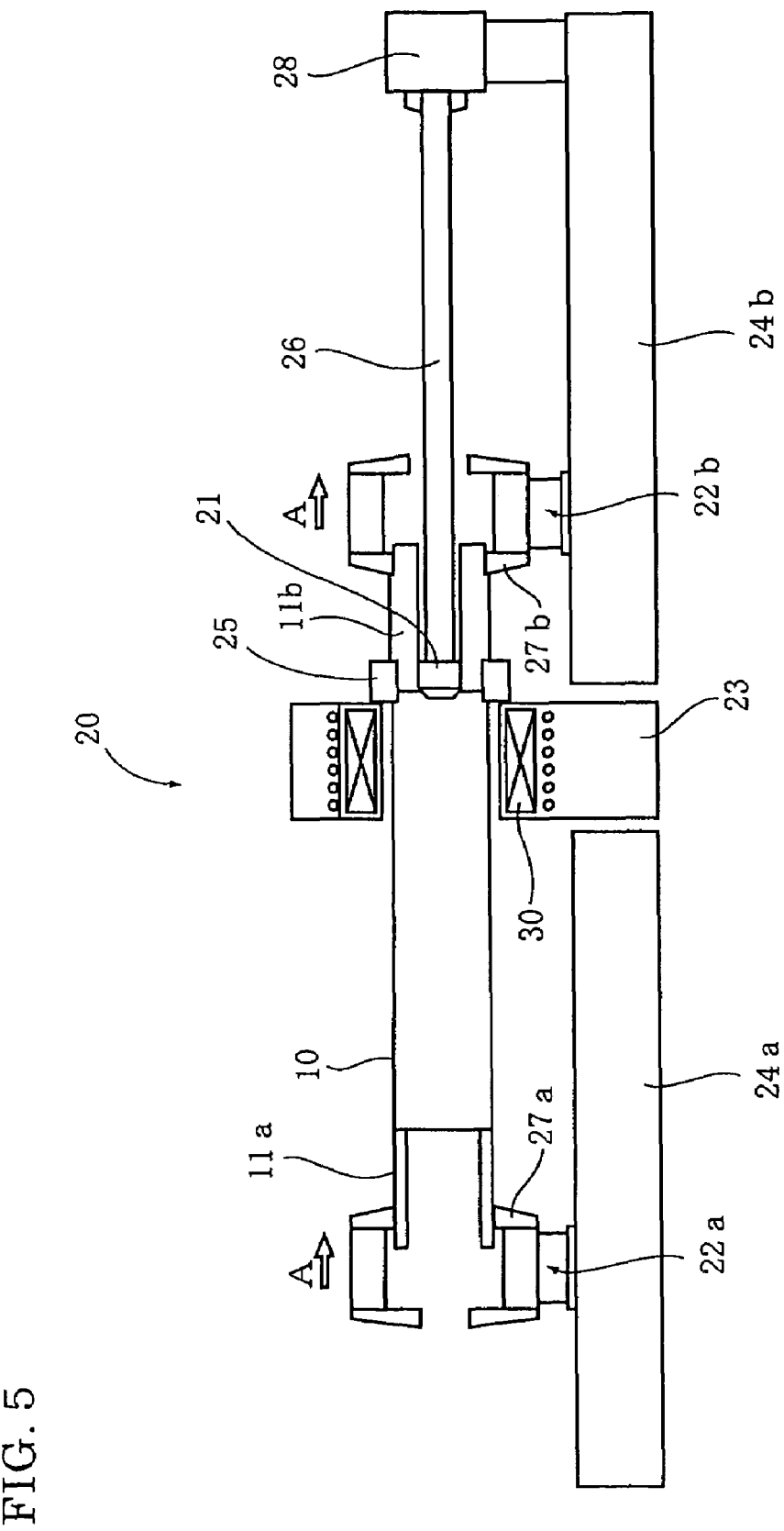
FIG. 5 is a view showing an example of piercing a cladding pipe.

When the cladding pipe is to be formed by a VAD method, the glass particle-deposit body is formed at the bottom of the starting rod, and subsequently dehydration and verification are performed to produce a solid glass rod, and thereafter the glass rod thus obtained is pierced. A piercing method may be such that a hole is formed using a drill, or as shown in FIG. 5, a hole is formed by pushing a piercing tool into the center portion of a glass rod softened by heating. In addition, as is the case of the OVD method, the cladding pipe may also be formed by the steps of depositing glass particles around a starting rod, extracting the starting rod, and then performing dehydration and sintering, or by the steps of performing dehydration and vitrification of a glass particle-deposit body and then extracting the starting rod.

Various known techniques may also be used as the manufacturing method of the cladding pipe as in the case of the manufacturing method of the core rod. Whenever necessary, the internal and the external surfaces of the cladding pipe may be mechanically grinded, polished, or elongated to have a predetermined external diameter so that the internal diameter, the external diameter, and the internal and external surface roughness are adjusted.

Referring to FIG. 5, a method of forming a hole by pushing a piercing tool into the center portion of a glass rod softened by heating will be described. A rod 10 to be formed into the cladding pipe is attached to a piercing apparatus 20. Chucks 27a and 27b of holding means 22a and 22b provided at both sides of a heating portion 23 hold supporting pipes 11a and 11b. A piercing tool 21 is inserted into a hole in the supporting pipe 11b from a receiving side and is pushed onto the end of the rod 10. The piercing tool 21 is fixed to a fixing means 28 through a supporting member 26 provided therebetween. A dice 25 is pushed onto the external surface of the rod 10 in a manner such that it faces the piercing tool 21 and nips the rod 10. The internal diameter of the dice 25 is set slightly smaller than the diameter of the rod 10. The dice 25 is disposed adjacent to the heating portion 23 at the receiving side.

By heat generated from a heating source 30, the rod 10 is heated in the range of 1,800° C. to 2,600° C. so as to be softened. The holding means 22a and 22b are moved on base stands 24a and 24b, respectively, at individual predetermined speeds from a feed side to the receiving side (direction indicated by arrow A in FIG. 5), so that the rod 10 is moved to the receiving side. The piercing tool 21 is pushed into the softened rod 10, thereby forming a hole. By the dice 25, a cladding pipe 10b is formed to have a predetermined external shape.

<Purification Step>

A purification step is performed for the cladding pipe thus formed. While a high DC voltage, such as 5 kV (10 V/mm in electric field) or more is applied inside the cladding pipe, the cladding pipe is maintained at a predetermined temperature in the range of 500 to 1,500° C. for 3 hours or more. In this manner, metal impurity cations existing in the glass or adhering to the internal and external surfaces of the glass are moved to a cathode side. Subsequently, by removing a part of the glass at which the impurities are gathered, a higher quality cladding pipe can be obtained.

Figure 6:
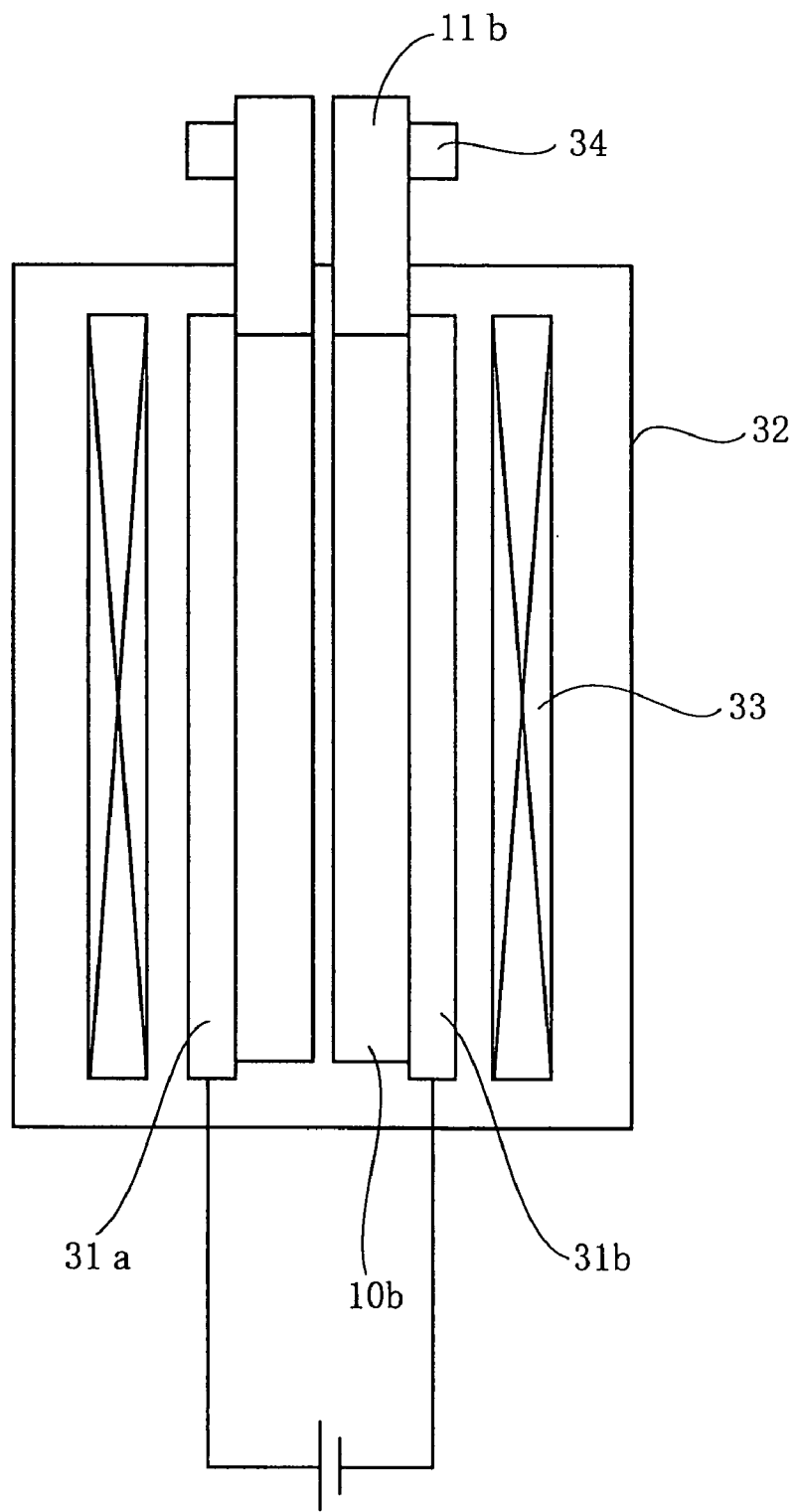
FIG. 6 is a view showing an example of purification of a cladding pipe.

For example, as shown in FIG. 6, an anode 31a and a cathode 31b are provided in a heating furnace 32, and the cladding pipe 10b is placed in the heating furnace 32 and is then sandwiched between the anode 31a and the cathode 31b. The supporting pipe 11b is held by holding means 34 in a state where the supporting pipe 11b protrudes outward from the heating furnace. Heat is generated by a heater 33, so that the cladding pipe is heated in the range of 500° C. to 1,300° C. A high DC voltage of 30 kV is applied between the electrodes 31a and 31b so as to move metal impurities to the cathode 31b side. Subsequently, the cladding pipe 10b is taken out from the heating furnace 32 and is then polished at the external circumferential portion thereof, so that the impurities are removed. In this case, preferably such polishing is performed such that the eccentricity of the internal circumference of the cladding pipe to the external circumference thereof is 0.3% or less, whereby the noncircularity and the eccentricity of an optical fiber formed from the cladding pipe can be decreased. The eccentricity of the internal circumference of the cladding pipe to the external circumference thereof is a value obtained by dividing the amount of displacement between the center of the external diameter of the pipe and the center of the internal diameter thereof by the external diameter.

<HF Washing Treatment>

The core rod and the cladding pipe obtained as described above are immersed in a hydrogen fluoride aqueous solution for washing. The hydrogen fluoride aqueous solution is easy to handle if it has a concentration of 0.1 to 50 percent by weight. The immersion time is set to 1 hour or more. By this treatment, impurity-containing layers present on the surface of the core rod and the internal and external surfaces of the cladding pipe can be removed.

The core rod and the cladding pipe thus washed are dehydrated by heating in an atmosphere containing an inert gas such as He or Ar, an $N_2$ gas, an $O_2$ gas, a halogen gas such as $Cl_2$ or fluorine, a gas containing a halogen atom, such as thionyl chloride ($SOCl_2$) or $SiF_4$, a gas such as $SiCl_4$, $GeCl_4$, $POCl_3$, $PCl_3$, $BCl_3$, or $BBr_3$, or a mixed gas thereof.

<Connection of Supporting Pipes>

Figure 7A:
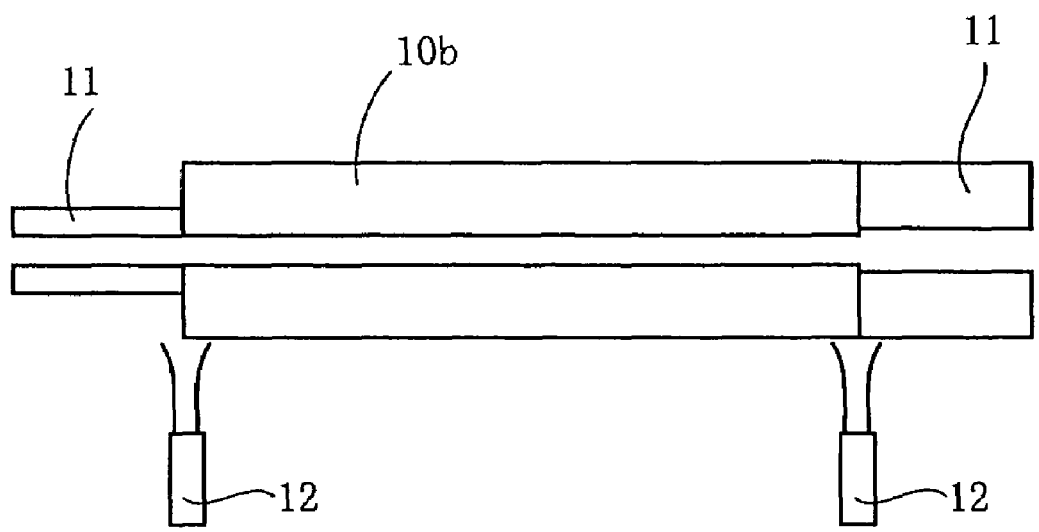
FIG. 7a is a view showing an example of fusion connection between a cladding pipe and a supporting pipe.
Figure 7B:
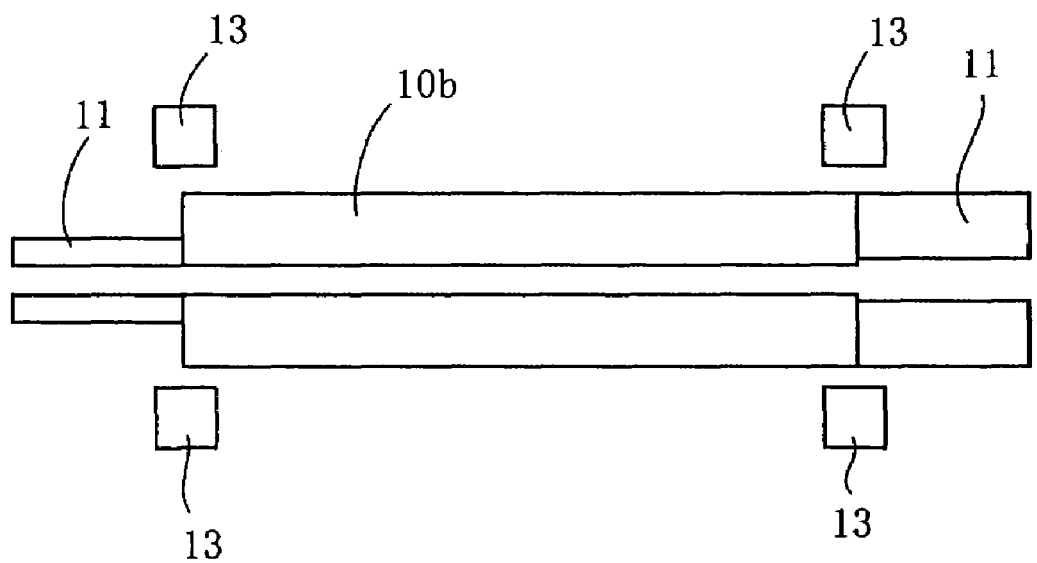
FIG. 7b is a view showing another example of fusion connection between a cladding pipe and a supporting pipe.

Supporting pipes are connected to the two ends of the cladding pipe whenever necessary so that the cladding pipe can be handled by holding the supporting pipes. The portions to be held are provided outside the cladding pipe so that the effective portion of the cladding pipe portion is prevented from being damaged by holding thereof. As shown in FIG. 7a, connection points between the cladding pipe 10b and supporting pipes 11 are heated by heating sources such as oxyhydrogen burners 12, so that the supporting pipes 11 are fusion-connected to the two ends of the cladding pipe 10b. Depending on the shape of the cladding pipe 10b, after the two ends of the cladding pipe 10b are cut away, the supporting pipes 11 may be connected to the cladding pipe. OH groups do not enter the connection points if a heating source generating no moisture is used, for example, when a plasma burner is used instead of the oxyhydrogen burner 12, or as shown in FIG. 7b, when a heater 13 of resistance heating type or induction heating type is used. That is, the concentrations of OH groups at the two ends of the cladding pipe can be maintained at a low level. Accordingly, the loss caused by OH groups can be decreased along the entire length of an optical fiber to be manufactured. A supporting pipe provided at a drawing starting side or a collapse starting side preferably has a smaller diameter than that of the cladding pipe. As described later, when the end of the cladding pipe is closed by collapsing the supporting pipe in rod-in-drawing so as to be unified with the core rod or a supporting member connected to the end thereof, the closing is easily performed if the supporting pipe has a smaller diameter.

<Attaching>

Figure 8:
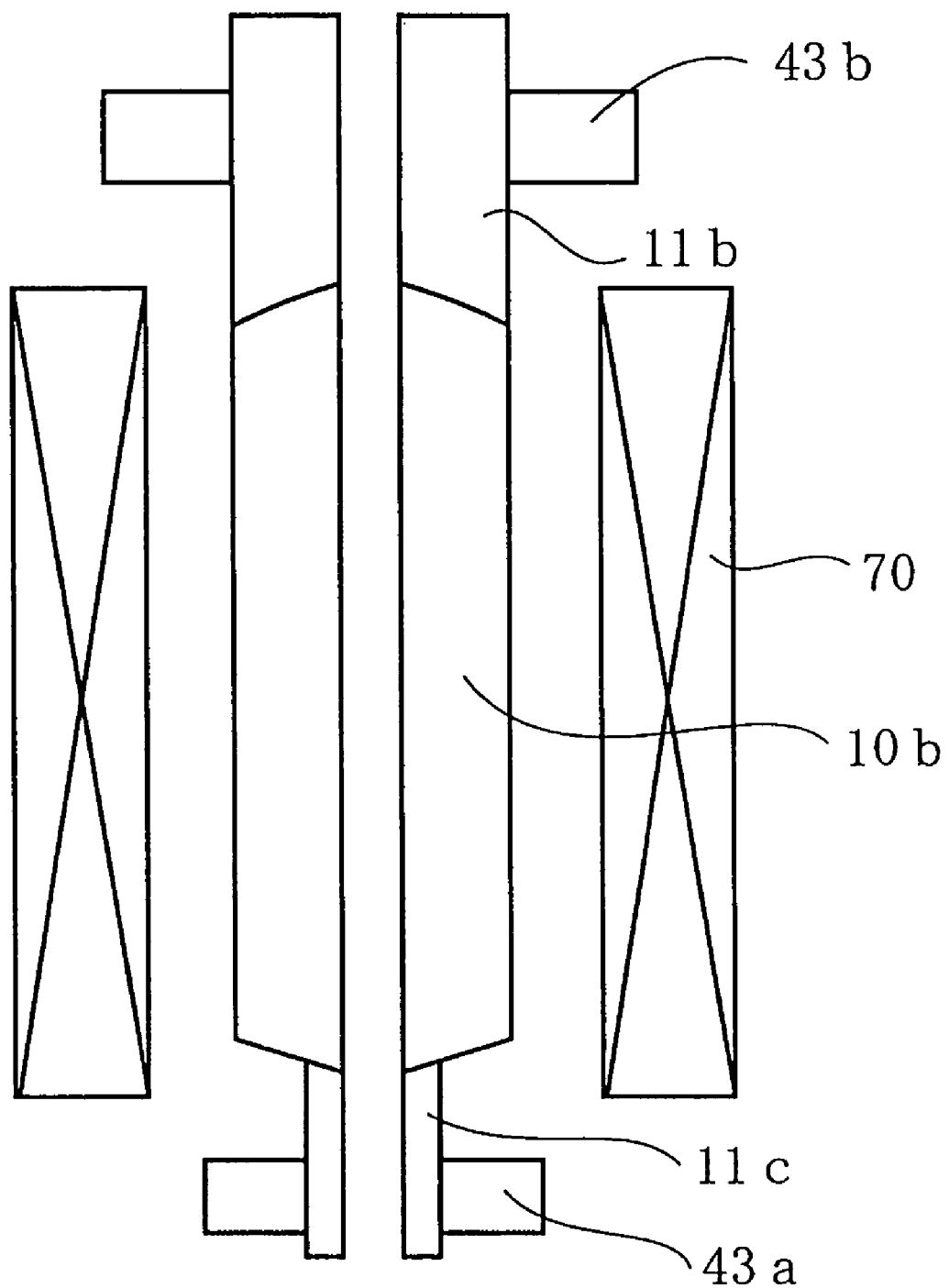
FIG. 8 is a view showing an example of heating of a cladding pipe.

As shown in FIG. 8, the cladding pipe 10b is vertically attached to a drawing apparatus. The supporting pipes 11b and 11c at the top and the bottom sides are attached to holding means 43b and 43a, respectively.

After the cladding pipe is attached to the holding means and before the core rod is inserted, preferably a dry gas is caused to flow in the cladding pipe and the internal surface of the cladding pipe is heated to a temperature in the range of 80° C. to 1,000° C. Heating in the range of 150° C. to 800° C. is more desirable. Moisture physically adhering to the internal surface of the cladding pipe is removed. The entire cladding pipe may be heated by a heating source having a length approximately equivalent to that of the cladding pipe, or heating may be performed by moving a heat source relatively to the cladding pipe when the heat source is shorter than the cladding pipe. The method of heating the cladding pipe, the core rod, and the dry gas present therebetween may be, for example, a method of blowing flame to the exterior of the cladding pipe, a method of blowing a gas in a plasma state, or a method of applying heat generated from a heater. In FIG. 8, an example is shown in which a heater 70 having a length approximately equivalent to that of the cladding pipe is used so as to simultaneously heat the entire heating zone.

<Vapor-Phase Etching>

After the heating and dehydration step for the cladding pipe, a step of vapor-phase etching may be performed for the internal surface of the cladding pipe. This step is an effective method when a large amount of impurities remains on the internal surface of the pipe, because impurities remaining on the internal surface of the pipe can be more effectively removed by etching treatment. When the amount of foreign materials on the internal surface of the pipe is decreased, fiber breakage in drawing and the formation of irregular points of an optical fiber can be suppressed. As an etchant gas, for example, a fluorinated compound gas such as $SF_6$, $NF_3$, $SiF_4$, $CF_4$, or $C_2F_6$, or a fluorine gas may be used. A mixed gas may also be used which contains the above compound gas and an inert gas such as helium or argon, $N_2$, $O_2$, or a compound gas having a dehydrating effect or an effect of removing transition metal, such as a compound gas containing a Cl atom.

In the vapor-phase etching step, the temperature of the internal surface of the pipe is increased to a temperature in the range of 1,000° C. to 2,300° C. A fluorinated compound gas, a fluorine gas, or the like is decomposed and is allowed to react with a glass, so that the internal surface of the pipe is etched. The etching amount is preferably set to 10 μm or more so that the roughness of the internal surface of the pipe is prevented.

<Smoothing of Internal Surface>

A step of smoothing the internal surface of the cladding pipe may also be performed in which a $Cl_2$ gas, a compound gas containing a chlorine atom, an $O_2$ gas, an He gas, or a mixed gas containing at least two kinds of gases among such gases is caused to flow through the cladding pipe and the internal surface of the cladding pipe is heated to a temperature in the range of 1,700° C. to 2,300° C. This step allows the roughness of the internal surface to be decreased to 20 μm or less by fusing and smoothing minute scratches or irregularities remaining on the internal surface of the pipe while the cladding pipe is not substantially deformed. When a chlorine gas is used, moisture chemically adhering to the cladding pipe and transition metal-based impurities remaining on the pipe can be removed, and the generation of bubbles can effectively be prevented.

<Insertion of Core Rod>

Figure 9:
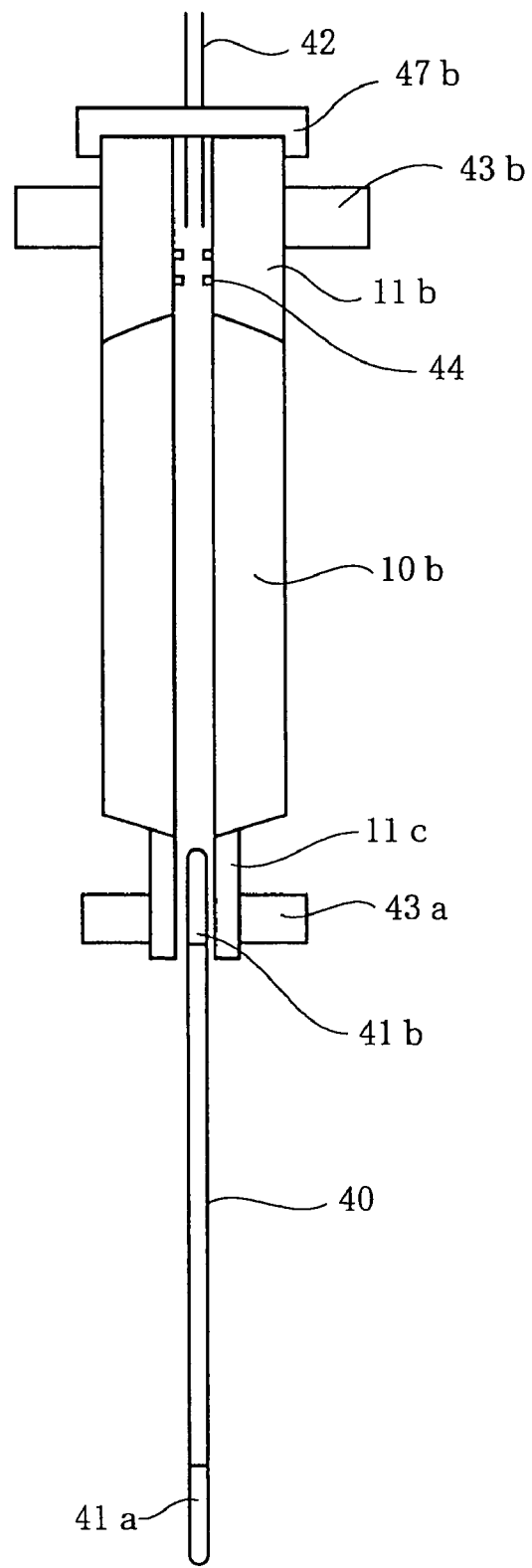
FIG. 9 is a view showing an example of insertion of a core rod into a cladding pipe.

As shown in FIG. 9, a core rod 40 is inserted into the cladding pipe 10b. By causing a dry gas to flow in the cladding pipe 10b from a pipe 42 which is fixed to a lid 47b and attached to the supporting pipe 11b, the air is prevented from entering the cladding pipe 10b and consequently the moisture in the air is prevented from adhering onto the core rod 40 and the cladding pipe 10b. The dry gas is caused to flow in the cladding pipe 10b from the side opposite to the side at which the core rod 40 is to be inserted. When the core rod 40 is inserted from the bottom side, the dry gas is made to flow from the top side, and vice verse when the core rod 40 is inserted from the top side. An airtight lid is preferably used as the lid 47b, and a lid made from a fluorinated compound resin may be used, for example. In order to enhance the airtight properties of the lid, a sealing material such as an O-ring may also be used, and for example, a lid made from quartz and an O-ring made from a fluorinated compound resin may be used in combination. As described below, supporting members 41a and 41b are preferably fusion connected to the two ends of the core rod 40.

The ratio D2/d2 between an external diameter D2 and an internal diameter d2 of a cladding pipe is determined by taking the ratio D/d of the diameter D of the core rod to the diameter d of core portion into consideration, and the core rod and the cladding pipe are combined so that an optical fiber having desired structure and properties can be formed. The gap between the core rod and the cladding pipe is preferably in the range of 0.05 to 3 mm. In other words, the difference between the internal diameter of the pipe and the diameter of the rod is 0.1 mm or more. When the rod is inserted into the pipe, and the gap therebetween is too small, the rod and the pipe are rubbed against each other, and scratches may occur in some cases. When the gap is excessively large, the unification therebetween by fusion may be unevenly performed.

In the case in which the gap between the core rod and the cladding pipe is large or the core rod is extremely thin, the core rod may be divided into two pieces. In such case, the core rods are mechanically brought into contact with each other. Accordingly, the eccentricity of the core caused by displacement or bending of the core rod can be suppressed. The contact portion in the core rod is discarded in drawing or after drawing.

<Dry Gas>

The dry gas is a gas containing hydrogen molecules or a compound containing a hydrogen atom (such as $H_2O$, or $CH_3OH$) at a total concentration of 10 volume ppm or less, desirably 4 volume ppm or less, particularly desirably 1 volume ppm or less, and most desirably 1 volume ppb or less. When the compound is moisture, the concentration thereof can be measured by the use of the dew point, and in this case, 10 volume ppm corresponds to −60° C., 4 volume ppm corresponds to −67° C., 1 volume ppm corresponds to −76° C., and 1 volume ppb corresponds to −112° C. The dew points described herein are those measured by the standard atmospheric pressure. As for kinds of gases, an inert gas such as He or Ar, $N_2$ gas, an $O_2$ gas, a halogen gas such as $Cl_2$ or fluorine, or a gas containing a halogen atom such as $SOCl_2$ or $SiF_4$ may be used. In addition, $SiCl_4$, $GeCl_4$, $POCl_3$, $PCl_3$, $BCl_3$, $BBr_3$, or the like may also be used.

<Fixing of Core>

The core rod is held and fixed by a fixing jig 44 placed in the supporting pipe beforehand. An optical fiber (good product) having the desired properties cannot be obtained from the part of the core rod which is held by the fixing jig 44. However, if the part held by the fixing jig 44 is formed of a supporting member which is only used for supporting the core rod, the core rod is not wastefully used. Hence, supporting members are preferably connected to the two ends of the core rod. In the case where an end of the cladding pipe is closed by collapsing the cladding pipe such that the cladding pipe comes into contact with the core rod, a good product cannot be obtained from the part at which the cladding pipe and the core rod are unified by collapsing. Hence, it is preferable that the supporting pipe connected to the cladding pipe be collapsed so as to be unified with the supporting member connected to the core rod, since the cladding pipe and the core rod are not wastefully used.

Figure 10:
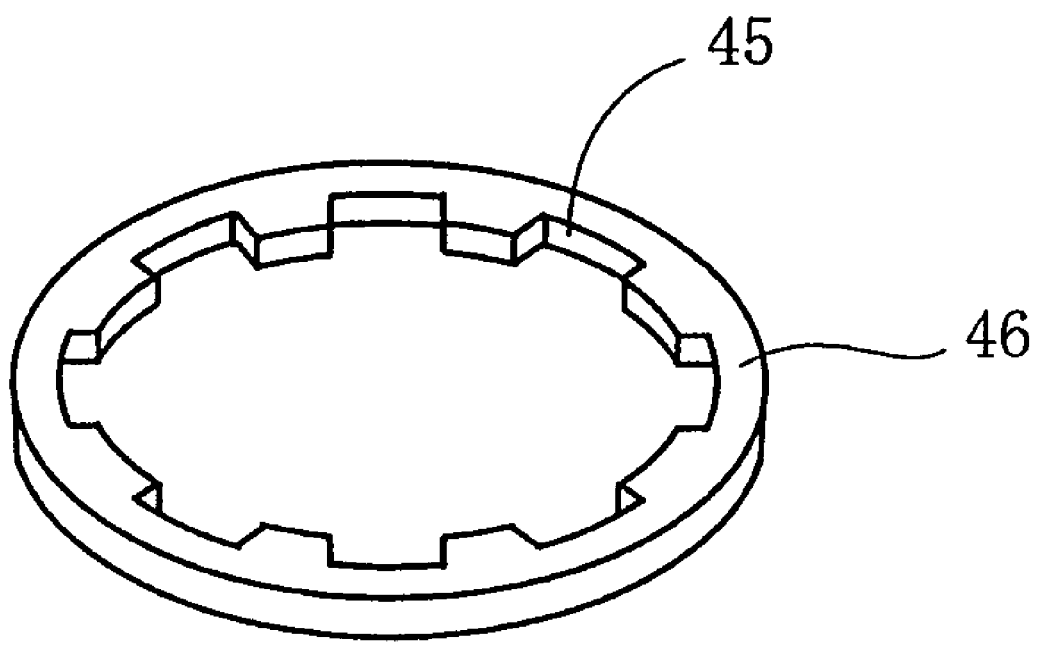
FIG. 10 is a view showing an example of a fixing jig for a core rod.

Hereinafter, the case will be described in which the supporting members 41a and 41b are fusion connected to the core rod and in which the supporting members are held by the fixing jigs. The fixing jig is, for example, a ring 46 having grooves 45 as shown in FIG. 10. The external diameter of the ring is formed slightly larger than the internal diameter of the supporting pipe, and the internal diameter of the ring 46 is formed slightly smaller than the external diameter of the supporting member. When the ring 46 is formed from an elastic material, the ring 46 can be pushed inside the supporting pipe, and the supporting member can be pushed inside the ring 46, so that the supporting member is fixed to the supporting pipe with the ring 46 provided therebetween. Accordingly, the core rod 40 is fixed in the cladding pipe 10*b*. Even when the core rod is in a fixed state, the dry gas can flow in a vertical direction through the grooves 45 of the ring 46.

Figure 11:
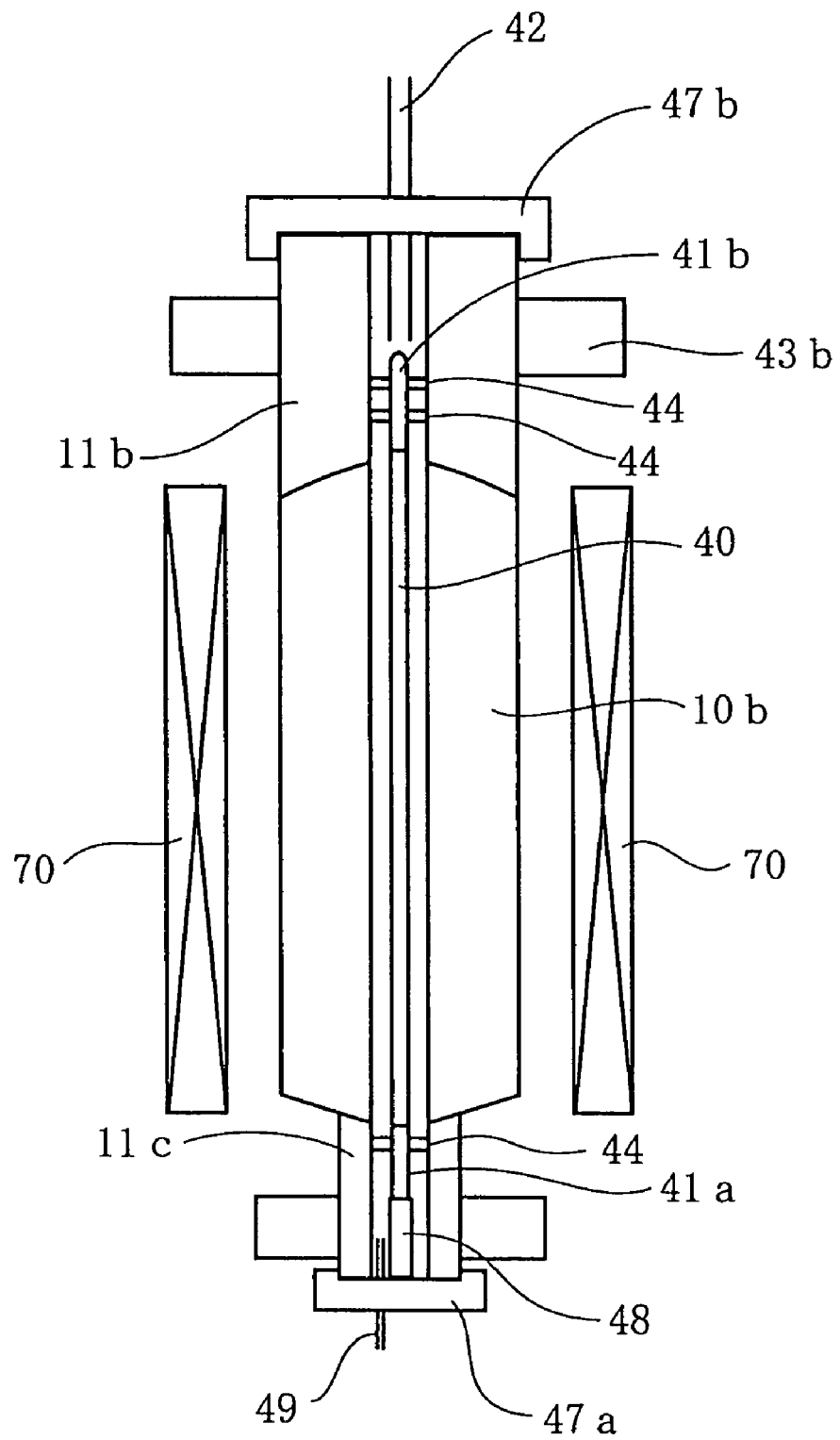
FIG. 11 is a view showing an example of insertion of a core rod into a cladding pipe and fixing thereof.

When the core rod 40 is inserted into the cladding pipe from the bottom thereof, as shown in FIG. 11, the fixing jigs 44 are inserted inside the supporting pipe 11*b* at the top side, and the supporting member 41*b* is pushed thereinto, so that the upper end of the core rod 40 is fixed. By the use of the fixing jigs 44, the core rod 40 can be fixed at the center of the cladding pipe 10*b*, and as a result, the noncircularity and the eccentricity of an optical fiber obtained by drawing can be decreased. The supporting member 41*a* is provided beforehand at the bottom end thereof with the fixing jig 44 and is pushed, together with the fixing jig 44, into the inside of the supporting pipe 11*c* located at the bottom side, a supporting bar 48 is placed under the supporting member 41*a*, and a lid 47*a* is fitted to the bottom end of the supporting pipe 11*c* located at the bottom side. The core rod 40 is fixed by the supporting pipe 11*b* and the supporting pipe 11*c* and is hung in the pipe, and the bottom end of the core rod 40 is supported by the lid 47*a* with the supporting bar 48 provided therebetween. The lid 47*a* is provided with a pipe 49 through which a gas can be supplied or exhausted. The supporting pipe 11*c* is sealed with the lid 47*a*.

Instead of the use of the fixing jig, the core rod can be held by decreasing the diameter of the end portion of the supporting pipe or that of the cladding pipe by heating. In this case, the diameter of the supporting pipe or that of the cladding pipe is decreased in a manner such that a gap is formed so as to allow a gas to flow up and down at the diameter decreased portion. The thickness of the end portion of the supporting pipe or the cladding pipe may be decreased so that the decrease in diameter can easily be accomplished. In an example shown in FIG. 12, the supporting member 41*b* is designed to protrude upward from the supporting pipe 11*b*, and the protruding portion is held by holding means 50 so that the core rod 40 is fixed. In this case, the pipe 42 and the supporting member 41*b* are disposed so as not to interfere with each other. The gap between the supporting member 41*b* and the lid 47*b* is decreased to the minimum. In particular, when a toxic gas such as $SF_6$ or $Cl_2$ is caused to flow inside the cladding pipe 10*b*, the airtightness should be secured by filling a sealing material in a gap between the supporting member 41*b* and the lid 47*b*.

Figure 12:
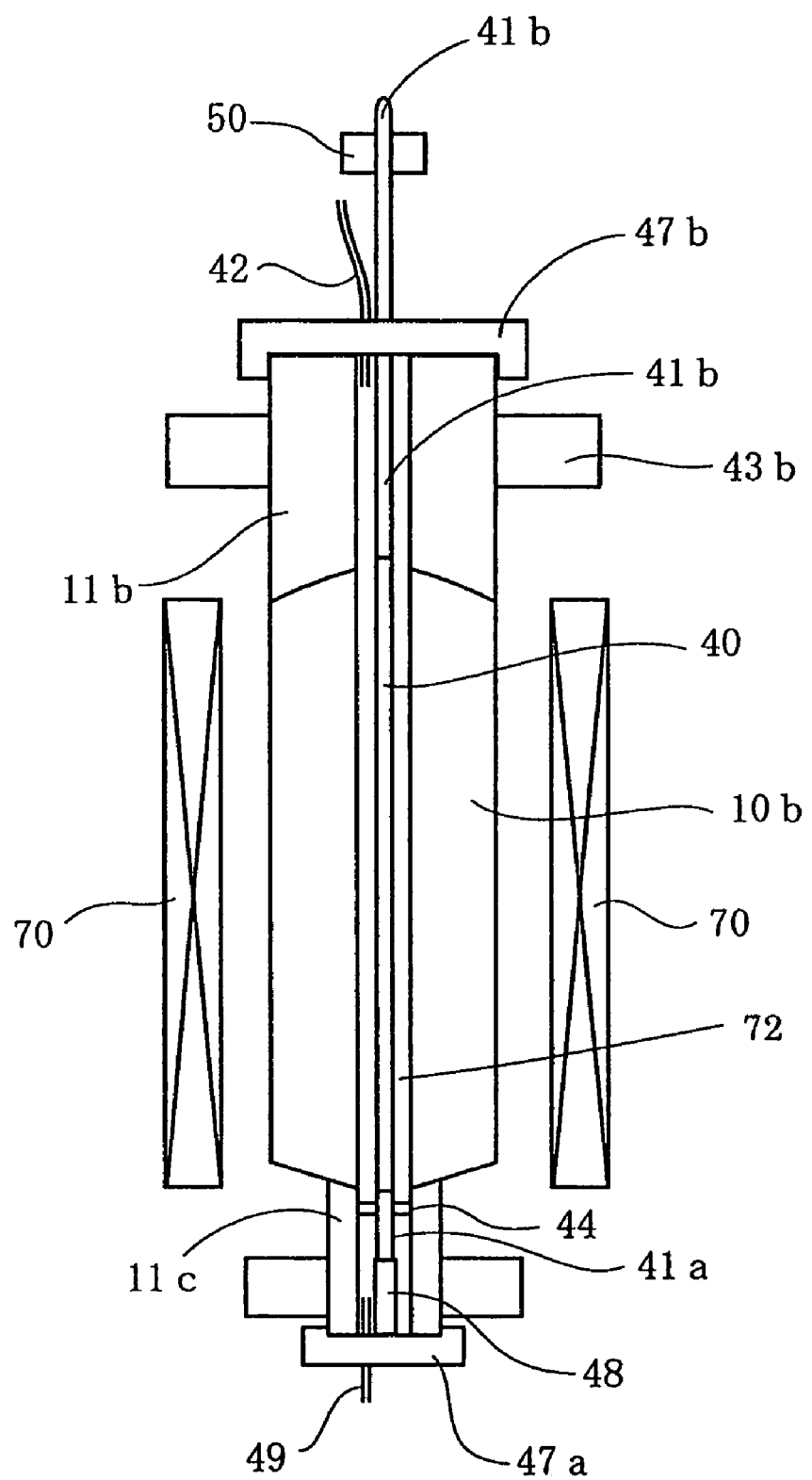
FIG. 12 is a view showing another example of insertion of a core rod into a cladding pipe and fixing thereof.

From the insertion of the core rod to the completion of drawing, in order to prevent moisture, hydrogen molecules, or a compound containing a hydrogen atom in the air from entering the cladding pipe, the space between the core rod and the cladding pipe is always placed in a dry-gas atmosphere, a reduced-pressure atmosphere, or a dry-gas and reduced-pressure atmosphere. The method of maintaining a dry-gas atmosphere inside the cladding pipe may, for example, be a method in which a gas inside of the cladding pipe is replaced with such a gas as mentioned above, followed by sealing, or a method in which a dry gas is exhausted from one end of the cladding pipe while such a gas as mentioned above is continuously supplied from the other end. In the latter method, a dry gas is supplied from the pipe 42, and a gas inside the cladding pipe 10*b* is exhausted from the pipe 49 as shown in FIGS. 11 and 12. When a dry gas is continuously supplied, the airtightness in the fitting of the lid 47*a* to the supporting pipe 11*c* is not required.

<Baking>

After the core rod is inserted in and fixed to the cladding pipe, the pipe and the core rod are heated in a state where the space formed between the core rod and the cladding pipe is connected to a dry-gas atmosphere and/or being decompressed so that hydrogen molecules or compounds containing a hydrogen atom, adhering onto the internal surface of the pipe and the surface of the core rod, are removed (hereinafter, this treatment is called dehydrogenation treatment). For example, while the space is connected to a dry-gas flow path and is supplied with a dry gas, the core rod and the cladding pipe are heated. Alternatively, while the space is being decompressed by exhausting a gas present in the space, the core rod and the cladding pipe are heated. Or, the core rod and the cladding pipe are heated while a dry gas is being supplied in the space and a gas therein is simultaneously being exhausted so that the space is in a decompressed state. A heating step performed for this dehydrogenation treatment is called a baking step. When the surface of the core rod and the internal surface of the cladding pipe are subjected to the dehydrogenation treatment by the baking step, the concentration of OH groups can be decreased in the vicinity of the rod-in interface of an optical fiber obtained by a subsequent rod-in-drawing step. Accordingly, it is possible to obtain an optical fiber exhibiting such a low value in the transmission loss caused by the presence of OH groups as could not have been attained by a rod-in-drawing in the past.

Hereinafter, an example of the case in which heating treatment is performed while a dry-gas atmosphere is being introduced will be described. As shown in FIGS. 11 and 12, a gas flow is generated from the top to the bottom of the cladding pipe by supplying a dry gas from the pipe 42 and exhausting a gas inside the cladding pipe 10*b* through the pipe 49. The gas flow may be generated in a direction opposite to that described above. The gas flow rate is preferably set to 1 liter or more per minute under the standard conditions. The internal surface of the cladding pipe or the surface of the core rod is heated to a temperature in the range of 80° C. to 1,000° C. If the temperature is high, such as more than 1,000° C., moisture physically adhering to the surface of the rod or the internal surface of the pipe may react with glass and chemically adhere onto the core rod or the cladding pipe, or may be bonded to glass in the form of OH groups; as a result, removal of the moisture may become difficult in some cases. The heating temperature is preferably 800° C. or less. When the heating temperature is set to 600° C. or less, no generation of OH groups on the glass surface occurs. When the temperature is set to 550° C. or less, moisture will not chemically adhere onto the glass surface. On the other hand, in order to remove physically adhering moisture, a temperature of 80° C. or more is effective; when the temperature is 150° C. or more, the removal can be performed in a short period of time; and when the temperature is 350° C. or more, the removal can be performed in a shorter period of time. For example, the internal surface of the cladding pipe is maintained at 450° C. for 30 minutes or more. The dry gas may be a gas such as nitrogen, oxygen, helium, or argon, or may be a gas containing a halogen gas or a halogenated gas.

The supporting pipe located at the side at which a dry gas is supplied during baking may be heated so that the dry gas may be warmed while flowing through the supporting pipe and thereafter supplied inside the cladding pipe. In this case, the flow rate of a gas flowing through the pipe may be set to, for example, 1 slm or more so as to prevent the air from flowing from the downstream side.

As a heating source, a burner or a heater may be used. It is preferable to use a heater in view of its not supplying moisture onto the external surface of the cladding pipe. The heating zone is set to the entire length of the cladding pipe. When the supporting pipe is to be collapsed to be unified with the core rod or the supporting member, the dehydrogenation treatment is performed in the baking step for a portion at an effective portion side from the place at which the supporting pipe or the supporting member is to be unified, so that the amount of hydrogen molecules or a compound containing a hydrogen atom, adhering to the portion described above, is decreased. Accordingly, OH groups are not generated on portions which are to be unified with each other in rod-in-drawing, and hence the increase in light transmission loss caused by OH groups will not occur. By the same reason as described above, when the concentration of OH groups of the supporting pipe and the supporting member is set 1 volume ppm or less in a region from the surface thereof to a depth of 10 μm therefrom, hydrogen in this area will not form OH groups and thereby will not cause the increase in light transmission loss.

When the length of a heating source is smaller than the length of the heating zone, the heating source should relatively be moved with respect to the cladding pipe and the core rod. Either of the heating source or the cladding pipe and the core rod may be moved, and they may be moved at different speeds from each other. By the use of a heating source having a length approximately equivalent to that of the heating zone, the entire heating zone may be simultaneously heated.

In the baking step, when the inside of the cladding pipe 10*b* is to have a reduced-pressure atmosphere, the exhaust amount of gas inside the cladding pipe 10*b* is increased as compared to the supply amount of a dry gas, or without supplying a dry gas, a gas inside the cladding pipe 10*b* is exhausted from the pipe 42 or 49. The pressure inside the cladding pipe 10*b* is preferably set to 60 kPa or less. Moisture removal is accelerated by the evacuation of the inside of the cladding pipe since moisture removed from the internal surface of the cladding pipe and the surface of the core rod is eliminated from the inside of the cladding pipe. In addition, moisture once removed from the cladding pipe or the core rod will not again adhere thereto. The baking step may be performed before the core rod 40 is fixed inside the cladding pipe 10*b* with fixing jigs and the like.

If the baking step is performed twice (first substep and second substep) at different temperatures, moisture on the core rod and the cladding pipe can be further removed. In the first substep, heating is performed so as to make the internal surface of the cladding pipe or the surface of the core rod to have a temperature in the range of 80° C. to 1,000° C. or preferably 150° C. to 1,000° C. as described above, and the second substep is preferably performed at a temperature higher than that in the first substep. The atmosphere in the space between the core rod and the cladding pipe in the first substep is such as described above; however, in the second substep, the space between the core rod and the cladding pipe is caused to have a dry-gas atmosphere containing a halogen gas or a halogenated gas. For example, while an atmospheric gas containing a gas such as Cl$_2$ having an effect of removing transition metals is supplied in the cladding pipe from one end thereof and is removed from the other end, the temperature inside the cladding pipe is increased to 1,000° C. or more. A gas containing a chlorine atom such as chlorine or SOCl$_2$, for example, may be used a gas having an effect of removing transition metals. The gas having an effect of removing transition metals may be diluted with helium, argon, or the like.

When the heating temperature is set to 1,020° C. or more, moisture chemically bonded to the surface of the core rod and the internal surface of the cladding pipe and to the vicinities thereof can be removed in a short time. In addition, since the vapor pressure of nickel chloride or iron chloride becomes 1 atm or more, the transition metals thereof can be removed by evaporation. For example, the internal surface of the cladding pipe is maintained at 1,020° C. for 30 minutes or more.

Prior to the above vapor-phase etching step or the above internal-surface smoothing step, the same treatment as the baking treatment may be performed while the space in the cladding pipe is connected to a dry-gas atmosphere and/or is maintained at a reduced pressure. By the treatment mentioned above, the generation of toxic products such as sulfuric acid, which may otherwise be caused by the reaction between an etchant gas and moisture, can be suppressed when the internal surface of the cladding pipe is processed by vapor-phase etching.

<Closing>

Figure 13:
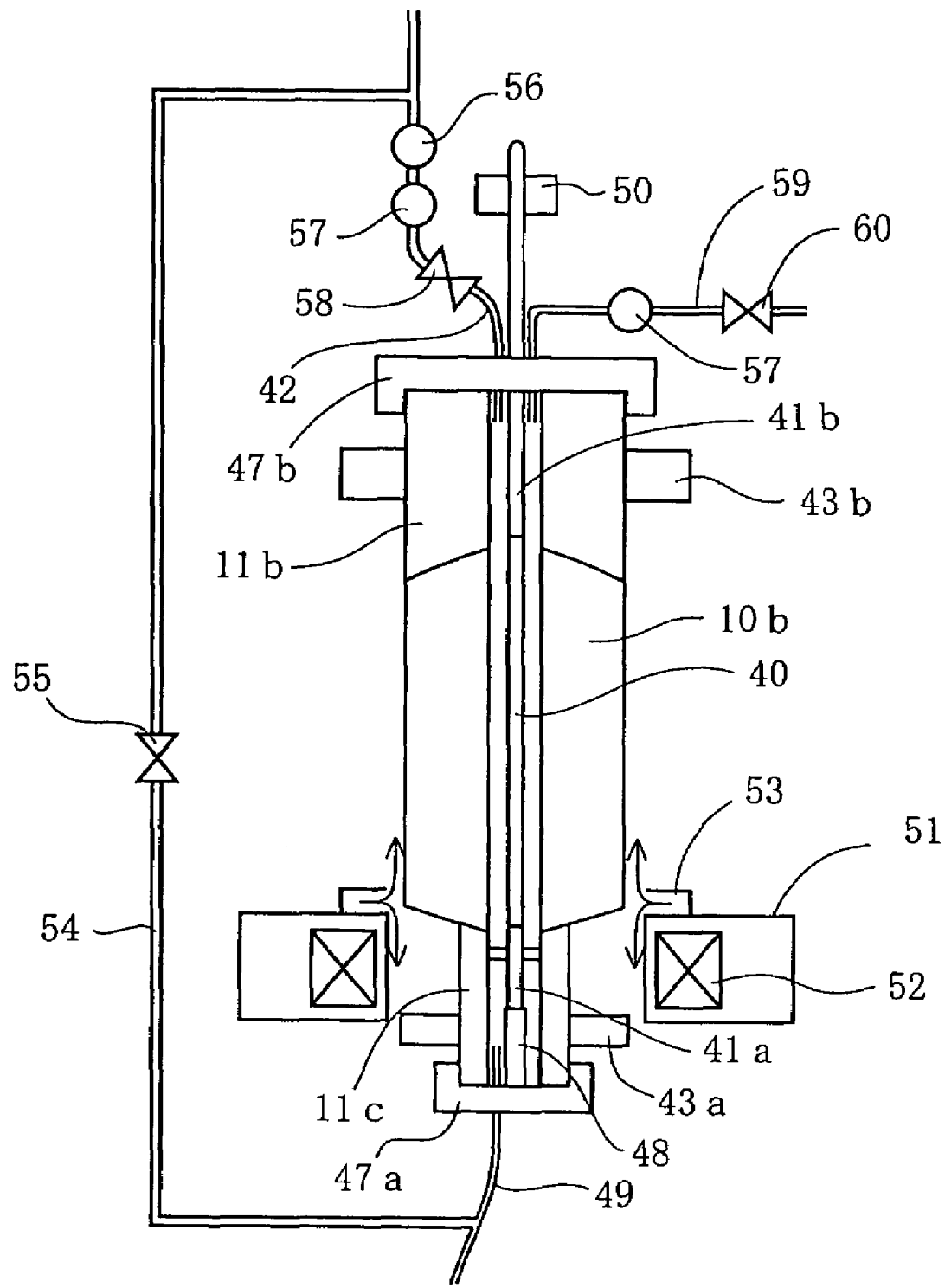
FIG. 13 is a view showing an example of a step of closing one end of a cladding pipe.
Figure 14A:
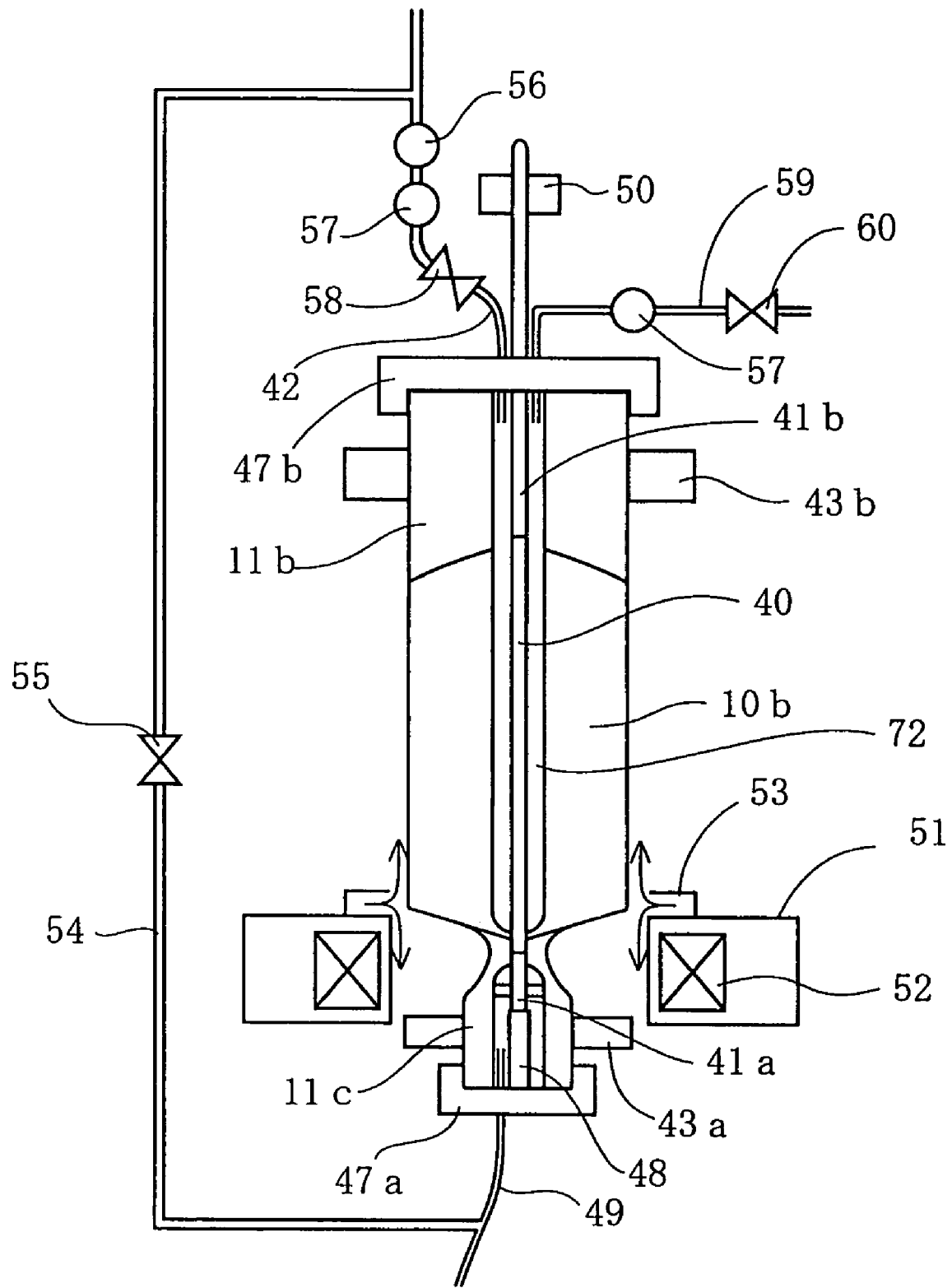
FIG. 14a is a view showing an example of a cladding pipe having one closed end.
Figure 14B:
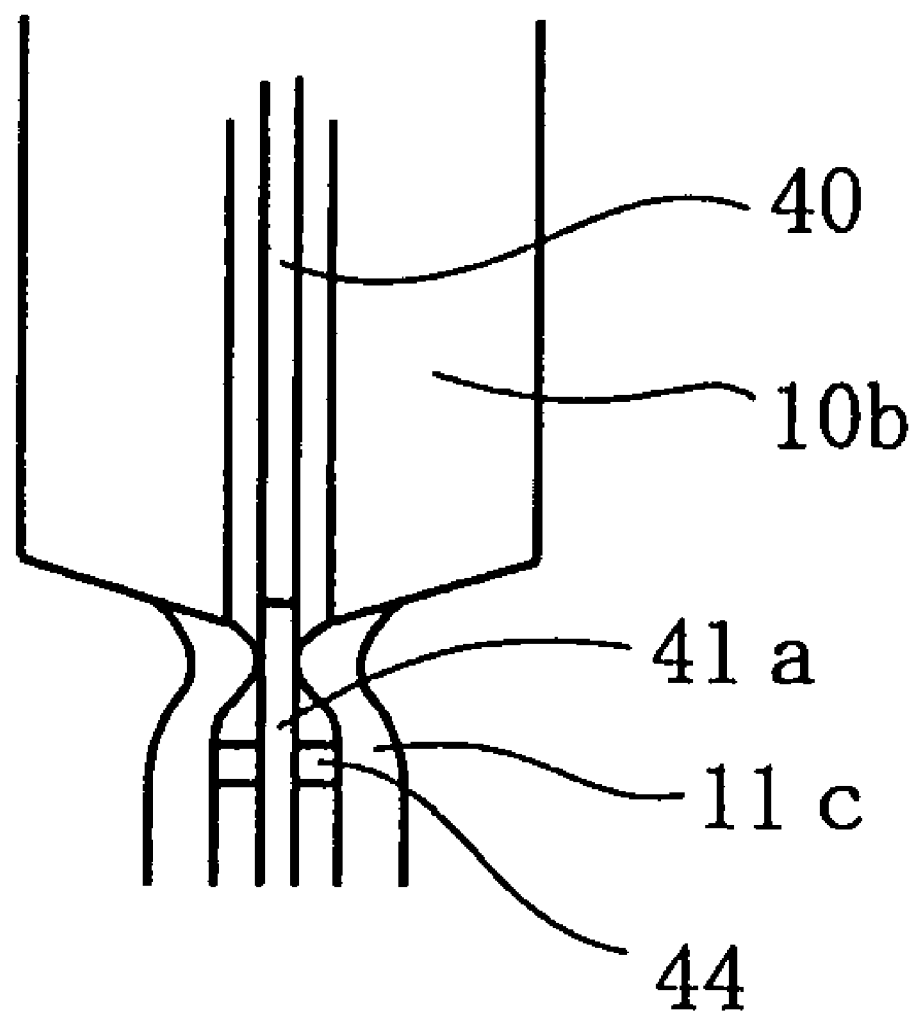
FIG. 14b is a view showing an essential portion of another example of closed one end of a cladding pipe.

After moisture on the surface of the core rod and the internal surface of the cladding pipe are removed by the baking step, as shown in FIG. 13, the supporting pipe 11*c* at the bottom side is placed at a position facing a heating portion 52 of a fiber-drawing furnace 51. In this step, the cladding pipe 10*b* may be moved, or the fiber-drawing furnace 51 may be moved. The heating portion 52 is caused to generate heat so that the cladding pipe 10*b* and the supporting pipe 11*c* are heated to a temperature in the range of 1,800° C. to 2,600° C., and the diameters of parts thereof are decreased. Thus, as shown in FIG. 14*a*, the core rod 40 and the cladding pipe 10*b* are unified together, so that the bottom end of the cladding pipe 10*b* is closed. Alternatively, as an essential portion is shown in FIG. 14*b*, the supporting pipe 11*c* and the supporting member 41*a* are unified together, so that the bottom end of the cladding pipe 10*b* is closed. Until the cladding pipe 10*b* is closed, a dry gas is supplied inside the cladding pipe 10*b* from the pipe 42, and a gas inside the cladding pipe 10*b* is exhausted from the pipe 49. In a space 72, a dry gas flows from the top to the bottom in FIG. 14*a*. A dry gas to be used may be oxygen, nitrogen, argon, helium, chlorine, or a mixed gas containing at least two kinds of these gases.

In order to maintain the airtight state of the space 72, a sealing material such as an O-ring is provided at a contact portion between the lid 47*b* and the supporting pipe 11*b*. However, when the space 72 is decompressed, outside air inevitably enters the space 72 from a gap between the lid 47*b* and the supporting pipe 11*b* or between the lid 47*b* and the supporting member 41*b*. In the first embodiment, by supplying a dry gas from the pipe 42 into the space 72, the amount of outside air entering the space 72 can be decreased, and in addition, by diluting and blowing away the outside air, the dew point in the space 72 can be maintained at a low level. On the other hand, according to the structure shown in FIG. 4 or FIG. 6 of PCT Japanese Patent Application Translation Publication No. Tokuhyo 2002-501871, it is impossible to cause a dry gas to flow through the space formed between the core rod and the cladding pipe, and outside air having a high dew point enters the space when the space is decompressed. As a result, the dew point in the space cannot be maintained at a low level, and hence the concentration of OH groups at a rod-in-interface of an optical fiber obtained from the core rod and the cladding cannot be decreased to a sufficiently low level.

A flow meter 56 and a pressure gauge 57 are provided for the pipe 42, so that the gas flow rate and the pressure inside the cladding pipe 10*b* are measured. According to the results, whether the bottom end of the cladding pipe 10b is completely closed or not can be determined. When the gas flow rate flowing from the top to the bottom of the cladding pipe 10b is rapidly decreased, or the pressure inside the cladding pipe 10b is rapidly increased, it is determined that the bottom end of the cladding pipe is completely closed. When the bottom end of the cladding pipe is closed, a valve 60 is immediately opened, so that air in the space 72 is exhausted from a pipe 59. In order to prevent the cladding pipe 10b from bursting when the cladding pipe 10b is closed and the pressure therein is increased, a bypath pipe 54 may also be provided. When the bottom end of the cladding pipe 10b is being closed, a valve 55 provided for the bypath pipe 54 is opened, so that a dry gas is allowed to pass through the bypath pipe 54 even when the cladding pipe 10b is completely closed.

When the bottom end of the cladding pipe 10b is closed, the bottom portion of the core rod 40 is softened by being heated; however, in the example shown in FIG. 13, the total weight of the core rod 40 is not applied to the softened portion because the core rod 40 is fixed by the holding means 50 with the supporting member 41b provided therebetween. Hence, the deformation of the core rod at the softened portion is suppressed.

As described above, the closing of the end of the cladding pipe 10b is not limited to the unification between the end portion of the cladding pipe itself and the core rod. The end of the cladding pipe can also be closed in a manner such that the supporting pipe is connected to the cladding pipe, and the supporting pipe and the core rod are unified together. When the supporting member is connected to the core rod, the end of the cladding pipe can also be closed by unifying the supporting member with the cladding pipe or the supporting pipe.

In the drawing step, drawing of an optical fiber is started from the unified portion. It takes a certain period of time from the start of fiber-drawing before the optical fiber drawing speed and the diameter of the optical fiber become predetermined stable values, and accordingly an optical fiber drawn during this period cannot be a good product and is discarded. In the case where the supporting pipe and the supporting member are unified with each other, the portion of an optical fiber to be discarded, which is drawn during a given period of time from the start of fiber-drawing, results from the supporting pipe and the supporting member, and hence almost all the optical fiber drawn from the cladding pipe and the core rod can be regarded as a good product, and accordingly, the yield can be improved.

The unification can easily be performed if the melting point is decreased by adding phosphorus, germanium, or fluorine to the respective portion to be unified of the cladding pipe, the supporting pipe, the core rod, and/or the supporting member.

Preferably, the closed portion is continuously heated for several to several tens minutes after the end of the cladding pipe is closed, so that the closed portion is prevented from having a noncircular shape. It is desirable to relatively rotate the cladding pipe, the supporting pipe, the core rod, and/or the supporting member with respect to the heating source, since the formation of a noncircular shape is thereby further prevented.

<Cycle Purge>

After one end of the cladding pipe 10b is closed, preferably the inside of the cladding pipe 10b is subjected to cycle purge so that the dehydrogenation treatment can be performed more effectively. As shown in FIG. 14a, a valve 58 provided for the pipe 42 is closed, a valve 60 provided for the pipe 59 is opened, and the inside of the cladding pipe 10b is evacuated through the pipe 59. The pressure gauge 57 is provided for the pipe 59, and the pressure inside the cladding pipe 10b is measured. When the pressure inside the cladding pipe 10b reaches 10 kPa or less, the valve 60 is closed so as to stop the evacuation, and the valve 58 is then opened so as to introduce a dry gas inside the cladding pipe 10b until the pressure therein reaches 50 kPa or more. The evacuation and the gas introduction described above are repeated, so that the inside of the cladding pipe 10b is placed in a dry-gas atmosphere.

The evacuation is preferably performed until the pressure becomes 1 kPa or less, and the gas introduction is preferably performed until the pressure becomes 100 kPa or more. By performing the cycle purge, hydrogen molecules or a compound containing a hydrogen atom, which could not be removed by baking, or hydrogen molecules or a compound containing a hydrogen atom, such as moisture, which have adhered onto the rod or the pipe after baking, can be removed.

<Rod-In-Drawing>

When the cladding pipe 10b is closed, the supporting pipe 11c at the bottom side is pulled out of the fiber-drawing furnace 51, and an optical fiber is drawn from the closed portion. As described above, when only one end of the cladding pipe is closed, the other end of the cladding pipe is connected to a dry-gas atmosphere in the drawing step, a gas in the space between the cladding pipe and the core rod is exhausted from the other end for reducing the pressure in the space, or decompression is simultaneously performed while the space is being connected to a dry-gas atmosphere.

While the core rod 40 and the cladding pipe 10b are being fed into the fiber-drawing furnace 51, the surface of the core rod is heated to a temperature in the range of 500° C. to 1,800° C., and the external surface of the cladding pipe is heated to a temperature in the range of 1,300° C. to 2,300° C., desirably 1,300° C. to 2,100° C., and more desirably 1,400° C. to 2,100° C. Accordingly, the core rod 40 and the cladding pipe 10b are unified with each other from the bottom to the top, and an optical fiber is drawn from the unified portion.

In this step, when the space between the core rod and the cladding pipe is decompressed to a pressure of 10 kPa or less, the surface of the core rod is heated to a temperature in the range of 500° C. to 1,300° C., and the external surface of the cladding pipe is heated to a temperature in the range of 1,000° C. to 1,800° C. When the space is not decompressed or is only slightly decompressed, the surface of the core rod is heated to a temperature in the range of 1,000° C. to 1,800° C., and the external surface of the cladding pipe is heated to a temperature in the range of 1,500° C. and 2,100° C. Accordingly, an optical fiber is formed from the core rod 40 and the cladding pipe 10b by rod-in-drawing. The cladding pipe 10b and the core rod 40 may be rotated around the axes thereof.

An inlet of the fiber-drawing furnace is provided with a gas supply portion 53, and an inert gas such as nitrogen or helium is blown to the cladding pipe, so that gas sealing is performed to prevent a gas outside the fiber-drawing furnace from entering the fiber-drawing furnace from the top thereof. Arrows from the gas supply portion 53 indicate the gas flow directions.

Figure 15:
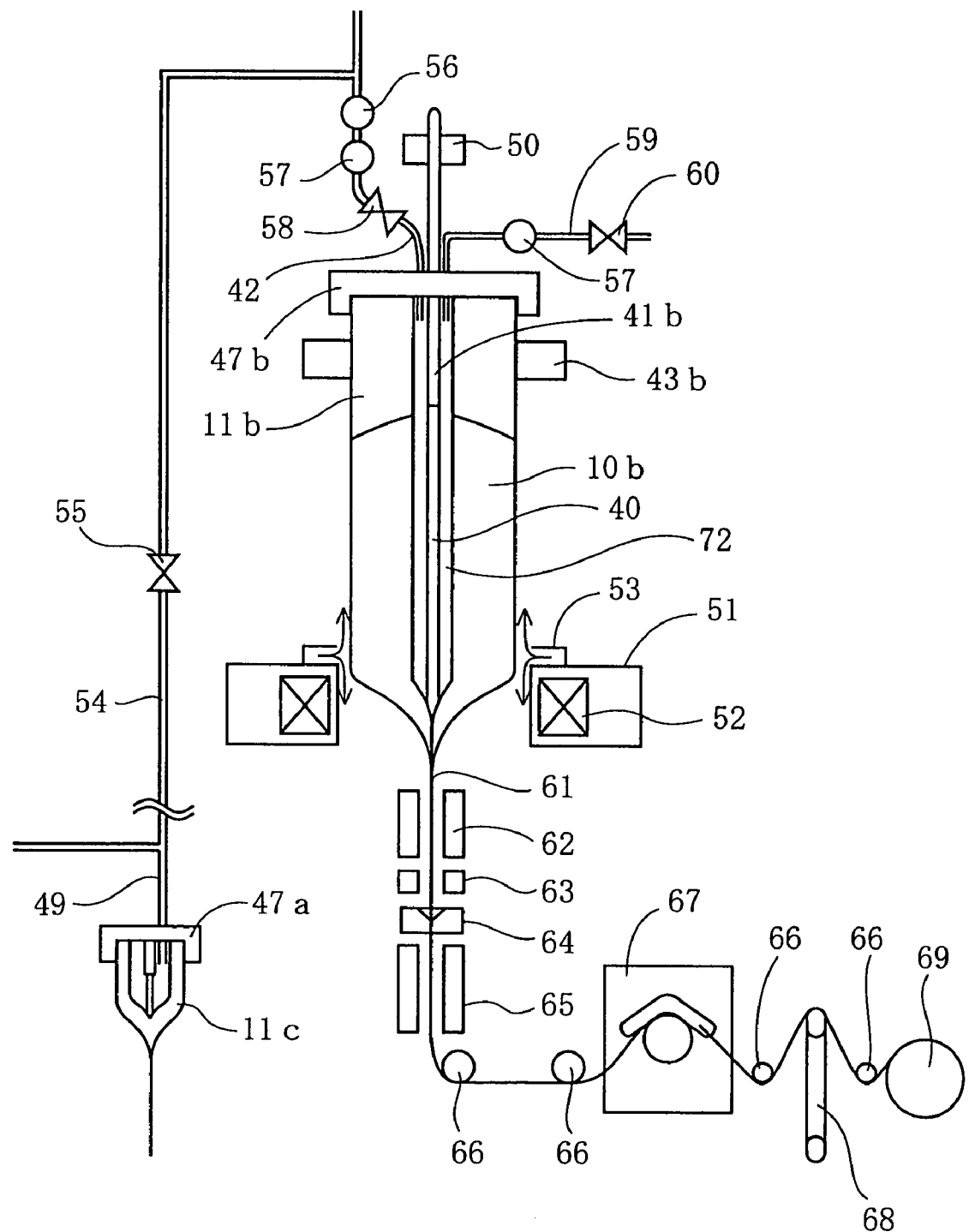
FIG. 15 is a view showing an example of rod-in-drawing.

When the fiber has been drawn to have a predetermined decreased diameter, the drawn fiber is cut off, and the supporting pipe 11c and the components connected thereto, that is, the lid 47a and the pipe 49, are separated from the cladding pipe 10b. Subsequently, as shown in FIG. 15, an optical fiber 61 is caused to pass through a cooling device 62, an external-diameter measurement device 63, a resin-coating device 64, and a resin-curing device 65, and is then laid on a path line composed of guide rollers 66, a capstan 67, and an accumulator 68. Thus, the optical fiber is pulled by the capstan 67 so as to be taken up by a winding device 69.

Figure 16:
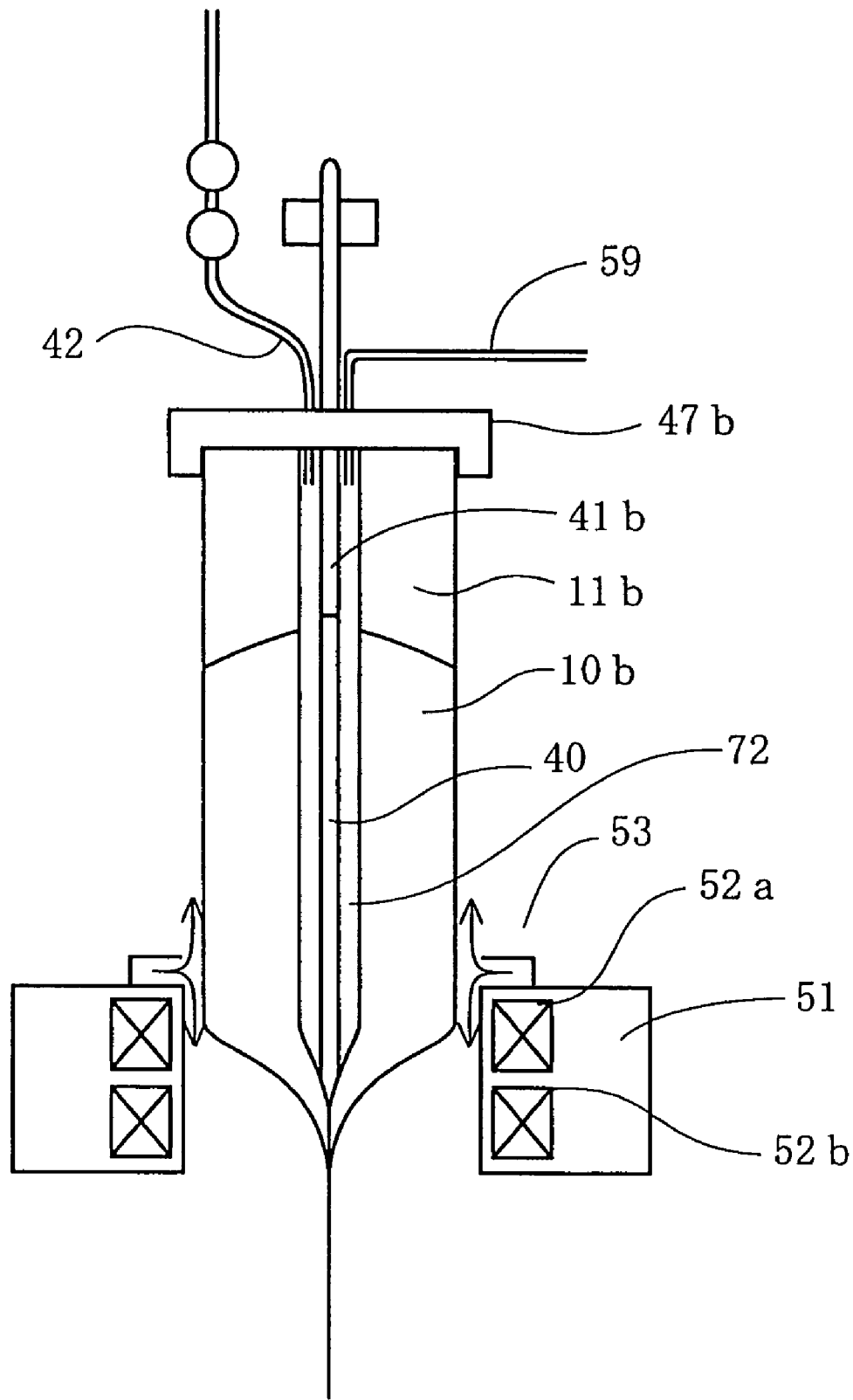
FIG. 16 is a view showing an essential portion of another example of rod-in-drawing.

A unified portion formed from the core rod and the cladding pipe is heated to a temperature in the range of 1,800° C. to 2,400° C. such that an optical fiber is drawn therefrom. FIG. 16 shows an example of drawing an optical fiber. In this example, a heating portion has a two-stage structure (52*a* and 52*b*), and the surface of the core rod 40 is heated to a temperature in the range of 500° C. to 1,800° C. by the upper side heating portion 52*a* so that the core rod 40 and the cladding pipe 10*b* are unified with each other, and the unified portion of the core and the cladding is heated to a temperature in the range of 1,800° C. to 2,400° C. by the lower side heating portion 52*b* so that an optical fiber is drawn. The temperature required for unifying the core rod 40 and the cladding pipe 10*b* together is adjusted in accordance with the degree of decompression of the space between the core rod 40 and the cladding pipe 10*b* as described above. On the other hand, the temperature required for drawing the unified portion formed from the core and the cladding is independent of the degree of decompression of the space. Therefore, the drawing speed can be increased if the temperature required for unification is controlled by the upper side heating portion 52*a* and the temperature by the lower side heating portion 52*b* is set higher than that of the upper side. Here, either of resistance heating and induction heating may be used as a heating method.

In rod-in-drawing, the connection between a dry-gas atmosphere and the space 72 between the core rod 40 and the cladding pipe 10*b* is done by connecting through the pipe 42 with an outside dry-gas supply source not shown in the figure. A dry gas comprising one of oxygen, nitrogen, argon, helium, chlorine, or a mixed gas containing at least two kinds of the enumerated gases is supplied into the space 72 through the pipe 42. The decompression of the space 72 is achieved by exhausting a gas in the space 72 through the pipe 59. Preferably, the space 72 between the core rod 40 and the cladding pipe 10*b* is decompressed by connecting the space existing between the core rod 40 and the cladding pipe 10*b* to the pipe 42 which is a dry-gas flow path and supplying a dry gas thereto, while the gas in the space 72 is decompressed through a pipe 59. A desirable degree of decompression in the space 72 is 10 kPa or less. Preferably, the pressure is further decreased to 4 kPa or less, more desirably to 1 kPa or less, and most desirably to 0.1 kPa or less. If the space between the core rod 40 and the cladding pipe 10*b* is connected to a dry-gas atmosphere, fiber-drawing can be performed while the dry gas is supplied thereto so that moisture in the air may be prevented from entering the space. By decompressing the space between the core rod 40 and the cladding pipe 10*b*, the amount of gas inside the cladding pipe 10*b* is decreased, and even if hydrogen molecules or a compound gas containing a hydrogen atom enters the space, the amount thereof can be decreased.

When the inside of the cladding pipe is decompressed, the core rod and the cladding pipe can be unified with each other at a low temperature. When the heating temperature is decreased, the amount of heat transmitted to the core can be decreased. In the case where the inside of the cladding pipe is decompressed to 10 kPa or less, the surface of the core rod is heated to a temperature in the range of 500° C. and 1,300° C. as described above, and the external surface of the cladding pipe is heated to a temperature in the range of 1,300° C. and 1,800° C. In these temperature ranges, the core rod and the cladding pipe are not softened so much as cause them to be deformed as a result of sagging by their own weight. Hence, the eccentricity and noncircularity of the optical fiber thus formed are small, the ratio of the external diameter of the cladding to the core diameter is maintained at a constant value along the lengthwise direction, and the variation in properties such as cutoff wavelength and dispersion is small.

In the case where the pressure of the space 72 is decreased to 4 kPa or less, the cladding pipe is easily collapsed even if it has a relatively thick wall thickness, and hence the temperature of the fiber-drawing furnace may not be unnecessarily increased. Accordingly, energy is not wastefully used. In addition, a larger degree of freedom for determining the drawing conditions such as linear speed and tension is obtained.

Figure 17:
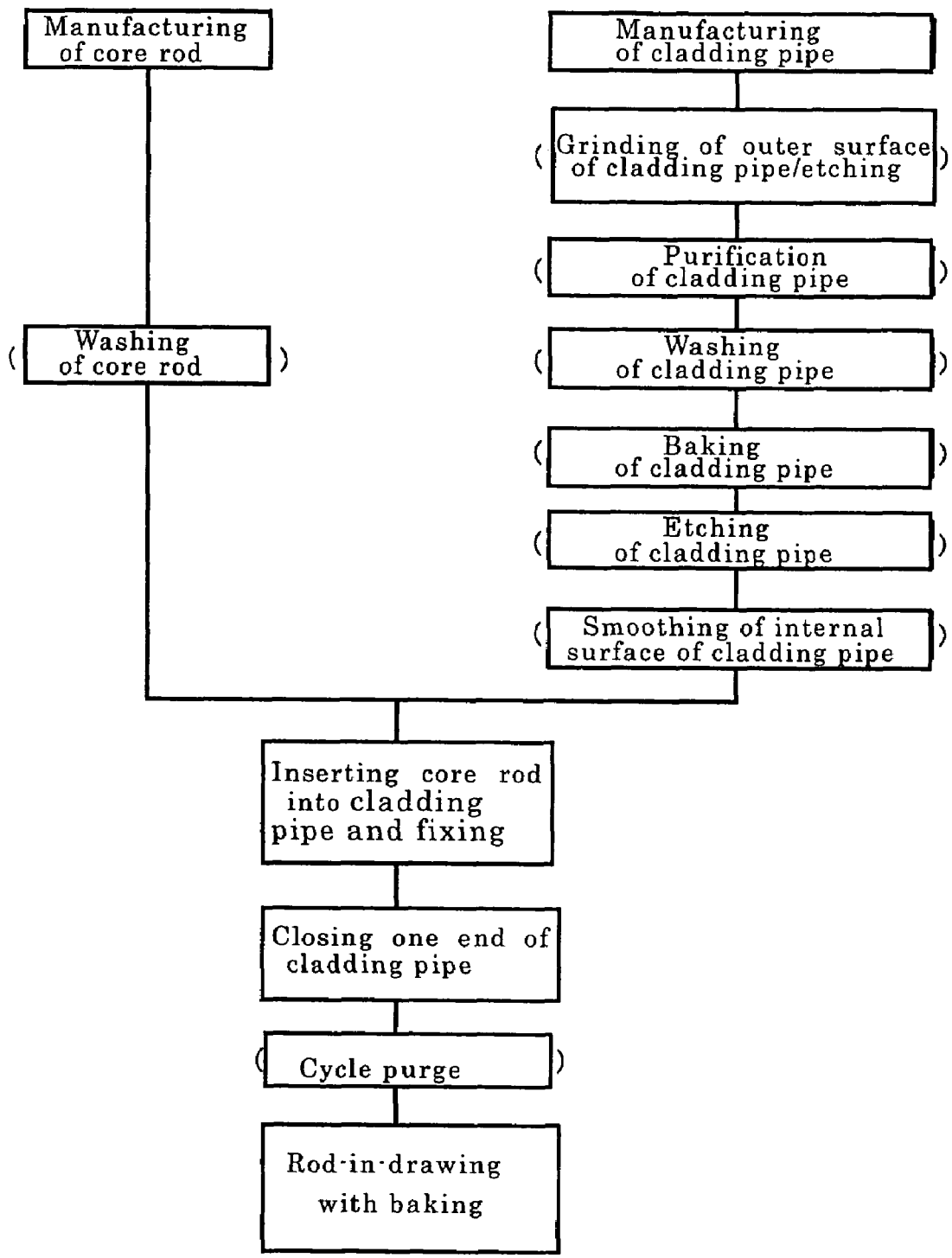
FIG. 17 is a flowchart showing a second embodiment of the present invention.

In a second embodiment shown in FIG. 17, an optical fiber is drawn while the surface of the core rod and the internal surface of the cladding pipe are processed by dehydrogenation treatment. In FIG. 17, the steps described in parentheses are steps which may be omitted. The step of inserting the core rod into the cladding pipe and fixing both of them and the preceding steps are equivalent to those in the first embodiment. Next, after at least one end of the cladding pipe is closed, the space between the core rod and the cladding pipe is subjected to cycle purge. The two steps described above are also equivalent to those in the first embodiment. Next, the core rod and the cladding pipe are moved to a position above the fiber-drawing furnace. In this step, a unified portion formed from the core rod and the cladding pipe by closing the cladding pipe is placed at a position above the center of the heating portion. The movement is made to a position such that the internal surface of the cladding pipe has a temperature of approximately 80° C. to 150° C. at the position that is closest to the unified portion formed from the core rod and the cladding pipe and at which the core rod and the cladding pipe are not yet unified together. The temperature of the heating portion 52 of the fiber-drawing furnace 51 may be temporarily decreased. In this case, the space between the core rod and the cladding pipe is kept connected to a dry-air atmosphere.

Subsequently, the core rod and the cladding pipe are gradually moved downward to the fiber-drawing furnace. In the case in which the temperature of the heating portion 52 is temporarily decreased, the temperature is increased. As the core rod and the cladding pipe are moved, the temperatures of the surface of the core rod and the internal surface of the cladding pipe are gradually increased at parts which are not yet unified with each other. In this case, the space between the core rod and the cladding pipe is connected to a dry-gas atmosphere at the portion that is located closest to the unified portion and at which the core rod and the cladding pipe are not yet unified together. Alternatively, the space between the core rod and the cladding pipe is connected to a dry-gas atmosphere, and simultaneously, the gas inside the space is evacuated so as to be decompressed. In this state, the surface of the core rod and the internal surface of the cladding pipe are subjected to baking since the surface of the core rod and the internal surface of the cladding pipe are heated to a temperature in the range of 80° C. to 1,000° C., and preferably in the range of 150° C. to 1,000° C. Subsequently, the core rod and the cladding pipe are gradually moved downward to the lower position of the fiber-drawing furnace. Thus, according to the movement of the core rod and the cladding pipe, the portion to be baked is shifted gradually to upper portions of the core rod and the cladding pipe.

When the portion at which the core rod and the cladding pipe are unified together reaches the vicinity of the center of the heating portion of the fiber-drawing furnace, the movement of the core rod and the cladding pipe is temporarily stopped. The core rod and the cladding pipe are held at the position so that the temperature of the portion where the core rod and the cladding pipe are unified together is increased.

When the temperature of the external surface of the cladding pipe at the unified portion is increased to a temperature in the range of 1,300° C. to 2,100° C., fiber-drawing is started from the unified portion so as to produce an optical fiber. The steps hereafter are to be performed in the same manner as that described in the first embodiment. As the optical fiber is continuously drawn, the core rod and the cladding pipe are also continuously introduced into the fiber-drawing furnace from the top side thereof to the bottom side. Hence, a part of the non-unified portion at which the surface of the core rod and the internal surface of the cladding pipe are to be heated is gradually shifted from the unified portion to the other end opposite thereto. The space between the core rod and the cladding pipe is connected to a dry-gas atmosphere. Simultaneously, the unification between the core rod and the cladding pipe proceeds in an upward direction. Hence, while the surface of the core rod and the internal surface of the cladding pipe are continuously baked, drawing of an optical fiber is performed. These steps can also be carried out while the decompression is being performed.

Figure 18:
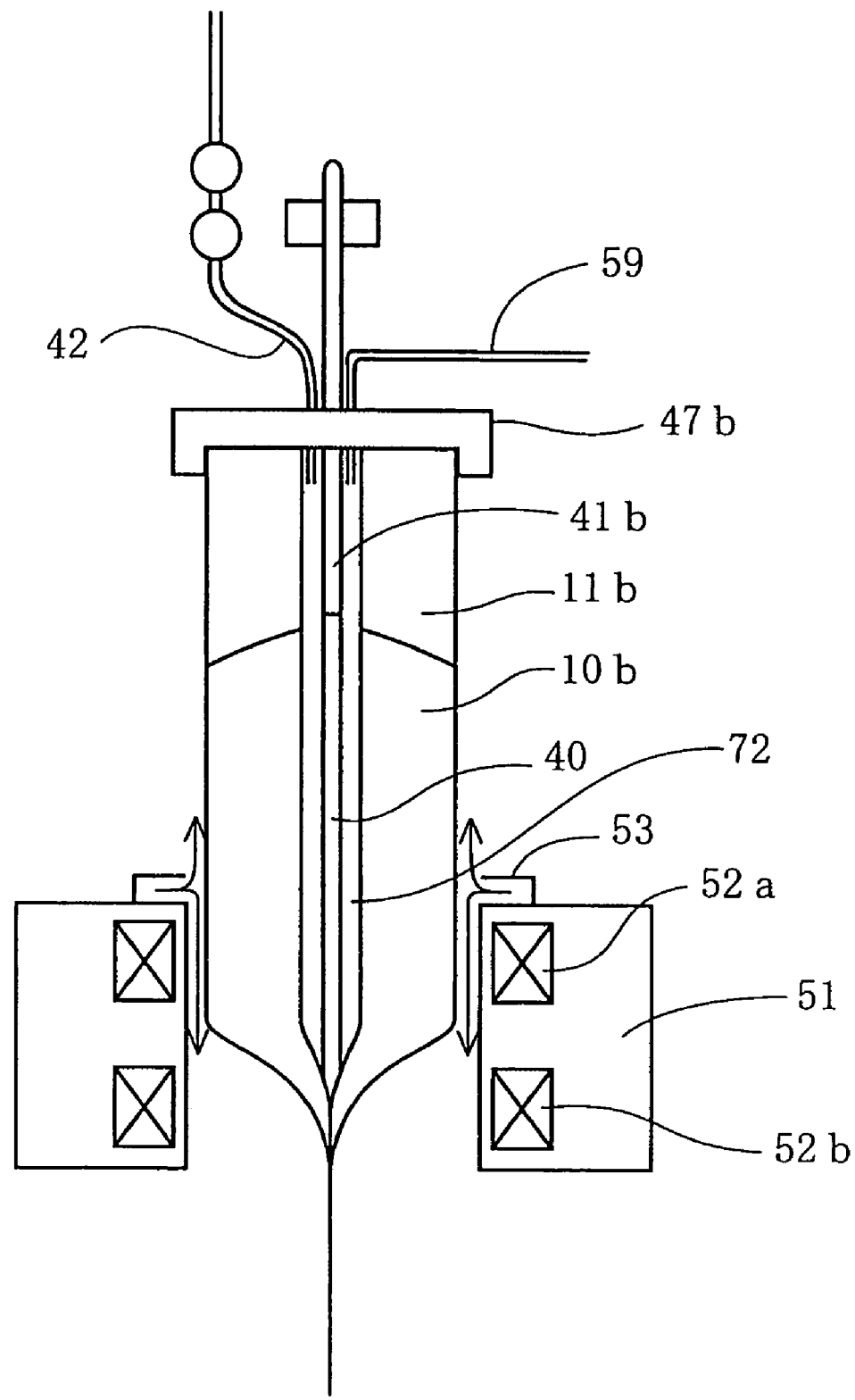
FIG. 18 is a view showing an essential portion of an example of rod-in-drawing of the second embodiment according to the present invention.

In the second embodiment, as shown in FIG. 18, the heating portion formed of at least two stages is effective. If the lower side heating portion 52b for heating the unified portion for fiber-drawing is heated to a temperature in the range of 1,800° C. to 2,400° C., and the temperature of the upper side heating portion 52a, which is disposed at a position facing the cladding pipe and the core rod which are not yet unified together, is set to a temperature in the range of 80° C. to 1,000° C., moisture physically adhering to the internal surface of the cladding pipe and the surface of the core rod, which are to be heated by the heating portion 52a, can be reliably removed.

According to a third embodiment of the present invention, rod-in-drawing of an optical fiber may be performed in a state in which the two ends of the cladding pipe are closed so that the inside thereof is sealed up.

In the case in which the two ends of the cladding pipe are to be closed, one end thereof is closed and subsequently the gas in the space between the core rod and the cladding pipe is exhausted from the other end so that the space is decompressed, and thereafter the other end is closed. Accordingly, an optical fiber preform can be obtained in which the space present between the core rod and the cladding pipe is in a decompressed state. The degree of decompression of the space is determined by the volume of the space existing when the two ends are closed. The space becomes smaller as rod-in-drawing is carried out, and hence the pressure thereof is increased. The space is decompressed so that the pressure of a gas present in the space at the end of fiber-drawing will not become the same with the atmospheric pressure or more. For example, the space is decompressed to 1 kPa or less. When this optical fiber preform is subjected to fiber-drawing, the space between the core rod and the cladding pipe is in a decompressed state.

When the end of the cladding pipe is closed, in either cases of closing only one end or the two ends, the dew point of the space between the core rod and the cladding pipe can be decreased by decompressing the space while the space is connected to a dry-gas atmosphere. Accordingly, the formation of OH groups on the surface of the core rod and the internal surface of the cladding pipe can be prevented, and hence the transmission loss due to OH groups of the optical fiber obtained by rod-in-drawing can be decreased.

The optical fiber preform composed of the cladding pipe which is closed at the two ends thereof and the core rod enclosed therein can be handled in the same manner as that for a conventional solid optical fiber preform. In the third embodiment, steps from the baking step to the step of closing the two ends of the cladding pipe are carried out in an apparatus different from the fiber-drawing furnace, and the optical fiber preform thus formed can be drawn in a fiber-drawing furnace equivalent to a conventional one. In view of the use of an existing production apparatus, the method described above is an effective method.

The closing of the cladding pipe in the third embodiment is done just to close the two ends of the cladding pipe, and unlike conventional rod-in-collapse, the entire length of the cladding pipe is not collapsed. Accordingly, the time, apparatuses, and running cost can be omitted to that extent, and as a result, the optical fiber can be manufactured at a low cost.

Figure 19:
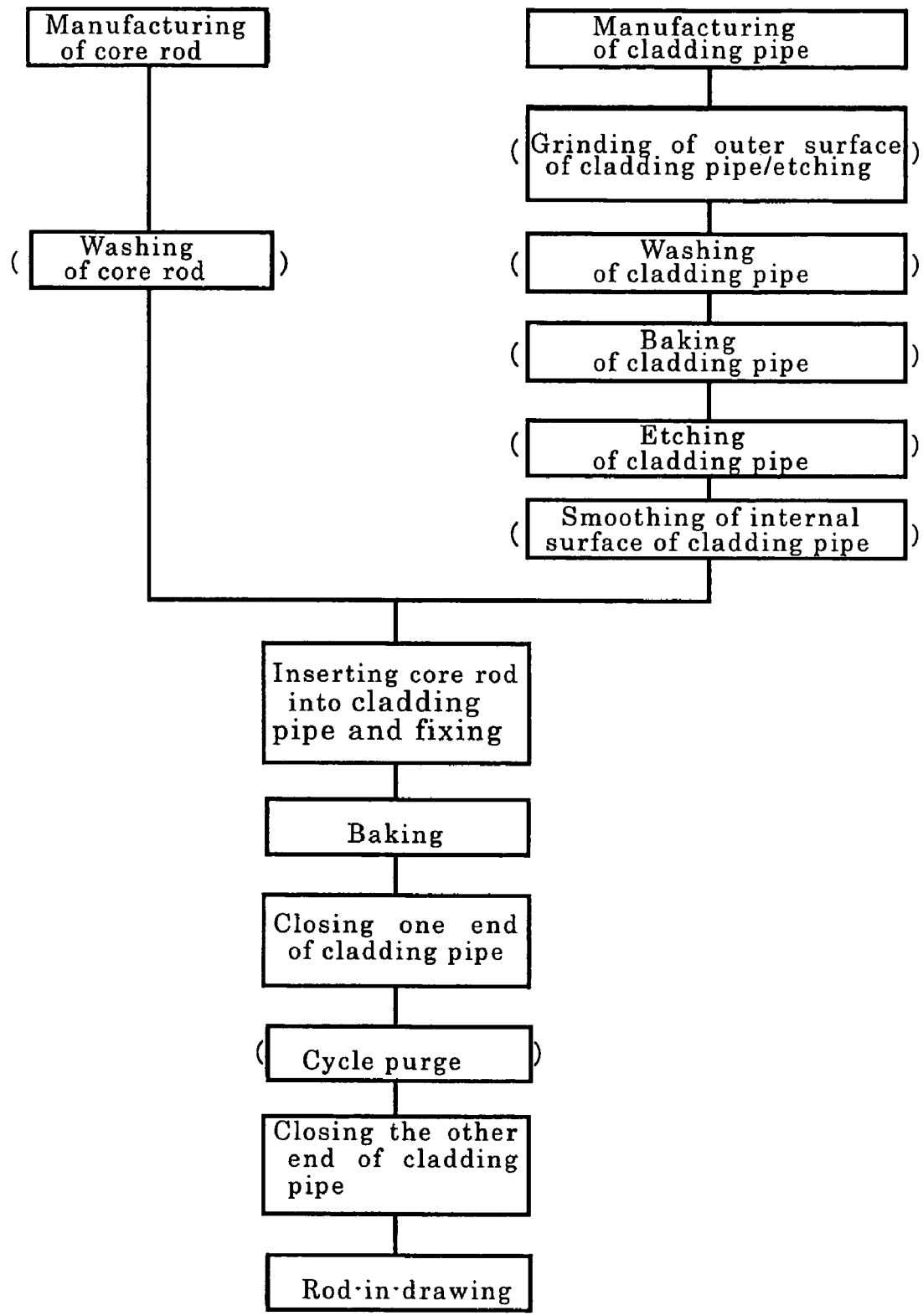
FIG. 19 is a flowchart showing a third embodiment of the present invention.

Referring to FIG. 19, the flow of the third embodiment will be described. In FIG. 19, the steps described in parentheses may be omitted.

The step of closing one end of the cladding pipe, which is performed after the dehydrogenation treatment for the surface of the core rod and the internal surface of the cladding pipe by a baking step, and the preceding steps are the same as those of the first embodiment. However, the baking step and the closing of the cladding pipe may be performed in a heating apparatus other than the fiber-drawing furnace provided that the baking step can be performed in the above heating apparatus. In addition, the heating apparatus is not limited to that shown in FIG. 12 in which the core rod and the cladding pipe are attached in a vertical direction, and a heating apparatus in which they are attached in a horizontal direction may also be used.

The cycle purge step performed after one end of the cladding pipe is closed is the same as that in the first embodiment. After a gas in the space is exhausted so that the pressure therein is decreased to 1 kPa or less, the other end of the cladding pipe is closed. The optical fiber preform which is closed at the two ends thereof is heated, and subsequently, rod-in-drawing is performed.

Figure 20:
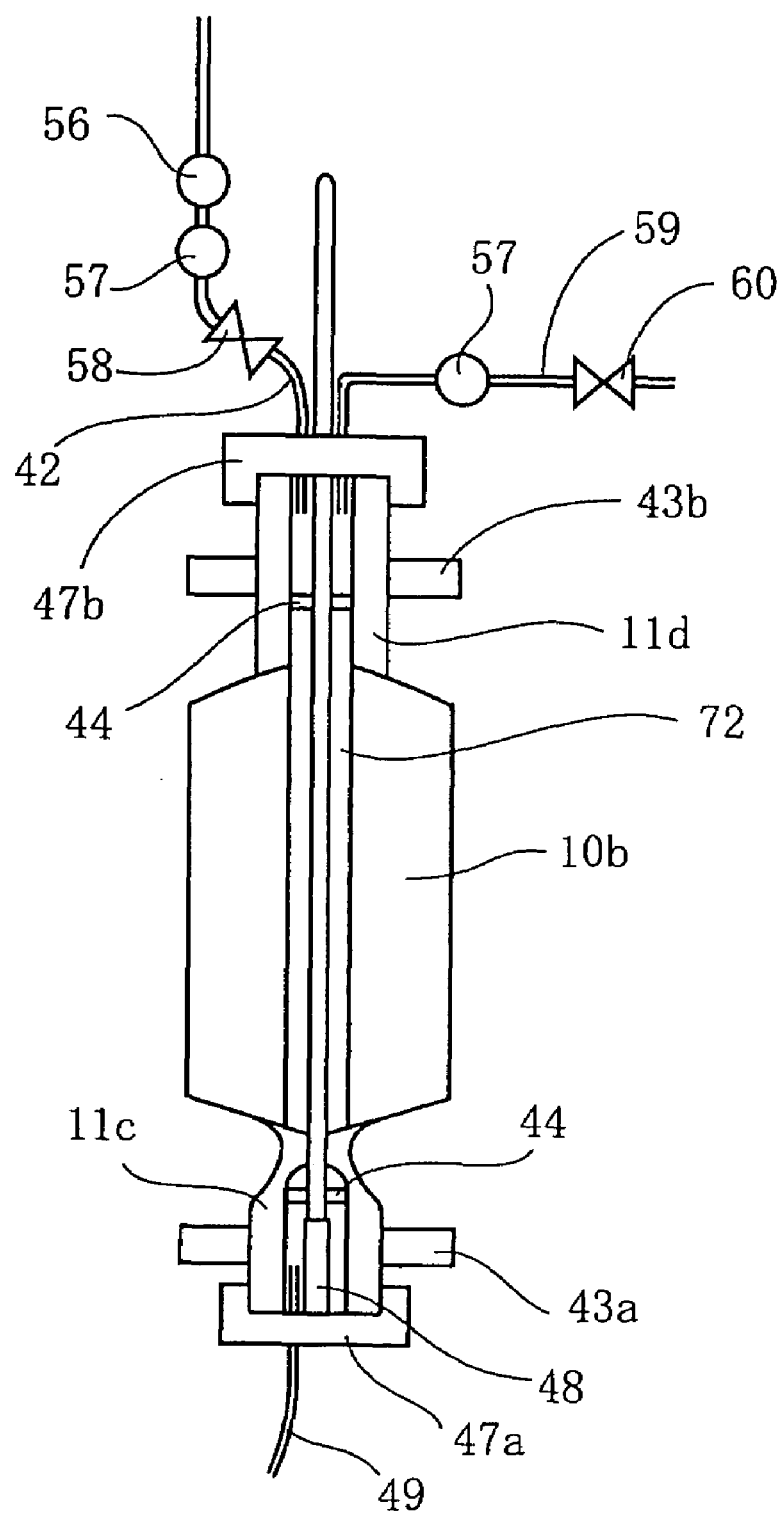
FIG. 20 is a view showing an example of an decompression step of decompressing a space formed between a core rod and a cladding pipe of the third embodiment according to the present invention.

Steps performed after one end of the cladding pipe is closed will be particularly described with reference to FIG. 20. The valve 60 is opened, and a gas in the space 72 is exhausted from the pipe 59. The pressure of the space 72 is monitored by the pressure gauge 57, and the gas in the space 72 is exhausted until the pressure is decreased to 1 kPa or less. After the pressure in the space 72 is once decreased to 1 kPa to less, cycle purge may be performed as in the first embodiment in which the gas introduction and the evacuation of the space 72 are to be repeated.

Figure 21:
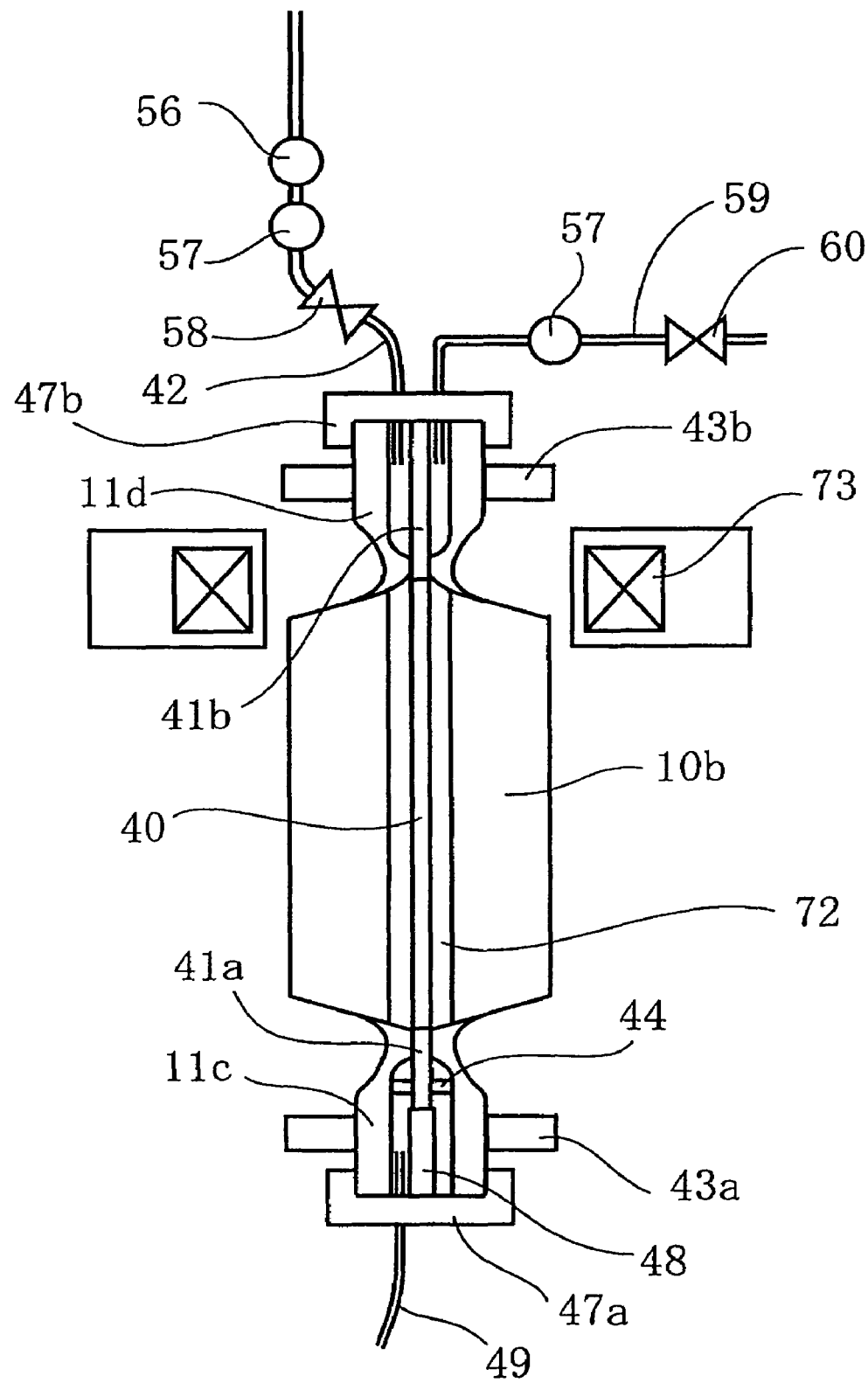
FIG. 21 is a view showing an example of closing two ends of a cladding pipe of the third embodiment of the present invention.

After the gas in the space 72 is exhausted to a pressure of 1 kPa or less, as shown in FIG. 21, a heating source 73 is placed at the top end of the cladding pipe 10b or at the side of a supporting pipe 11d, and the supporting pipe 11d or the top end of the cladding pipe 10b is collapsed so as to be unified with the supporting member 41b or the core rod 40. As shown in FIG. 21, the supporting pipe 11d and the supporting member 41b are preferably unified with each other since the entire length of the core rod 40 and that of the cladding pipe 10b are effectively used.

When the closing of the two ends of the cladding pipe is completed, the evacuation is stopped, and the lids 47a and 47b and the various pipes are disassembled from the supporting pipes.

The supporting pipe and the supporting member are cut off, or they are torn off after being heated, at a position outside the unified portion at the side at which fiber-drawing of the optical fiber preform thus formed is started. The end which is cut off or torn off is preferably processed so as to have a shape suitably usable for the start of drawing. As described above, an optical fiber drawn for a certain period of time from the start of drawing cannot be formed into a good product. Hence, some parts of the supporting pipe and the supporting member are preferably allowed to remain as fiber-drawing-start marginal ends to the extent that initial fiber-drawing for such period of time is done with such parts of the supporting pipe and the supporting member.

Figure 22:
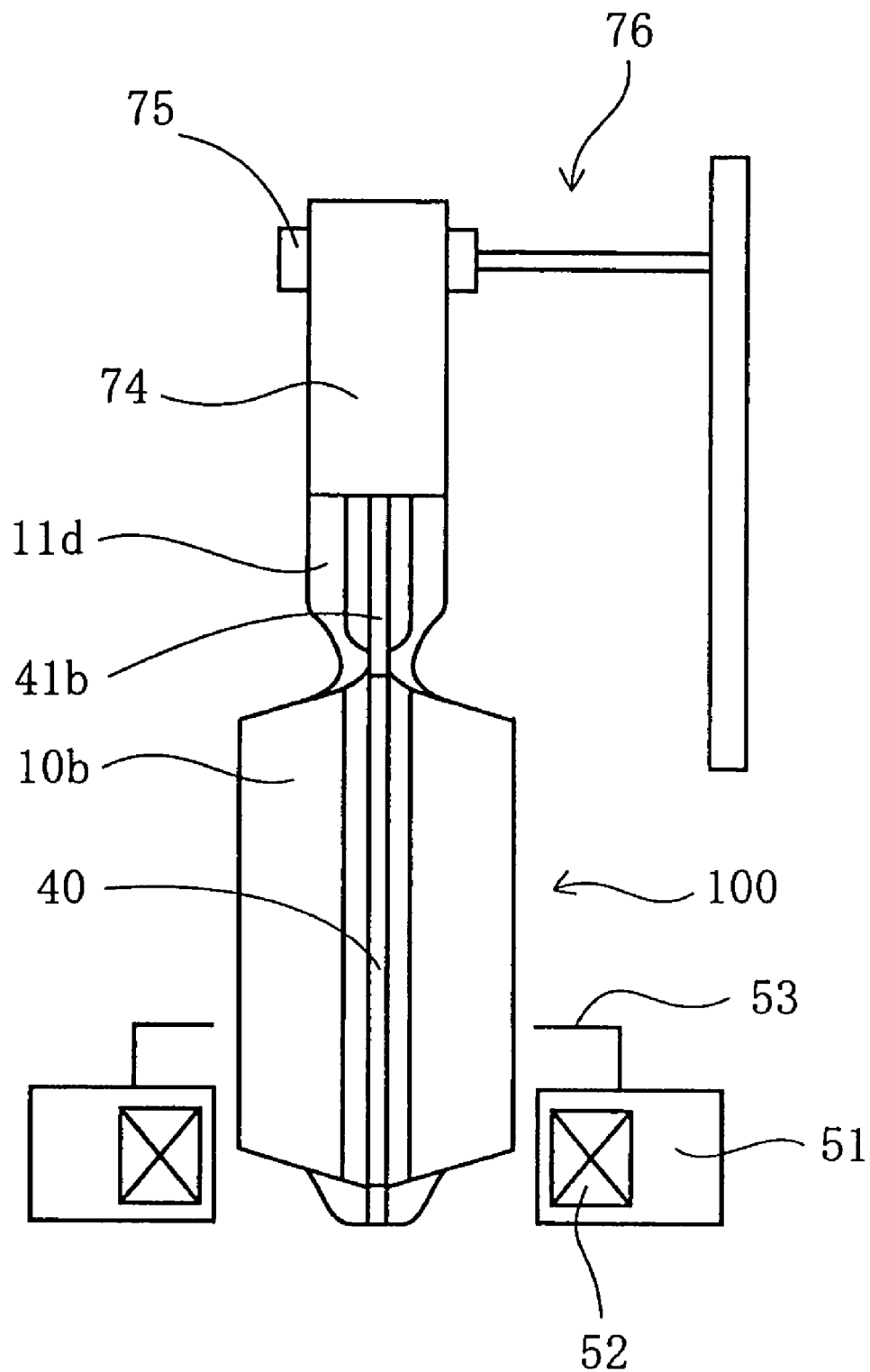
FIG. 22 is a view showing one example of starting state of rod-in-drawing according to the third embodiment of the present invention.

As shown in FIG. 22, an extension member 74 connected to the supporting pipe 11d is held by holding means 75, and an optical fiber preform 100 is carried into the fiber-drawing furnace 51 from the drawing-start end of the preform 100. Alternatively, without using the extension member, the supporting pipe 11d may be held directly by the holding means 75. The holding means 75 is connected to a preform feed device 76.

Figure 23:
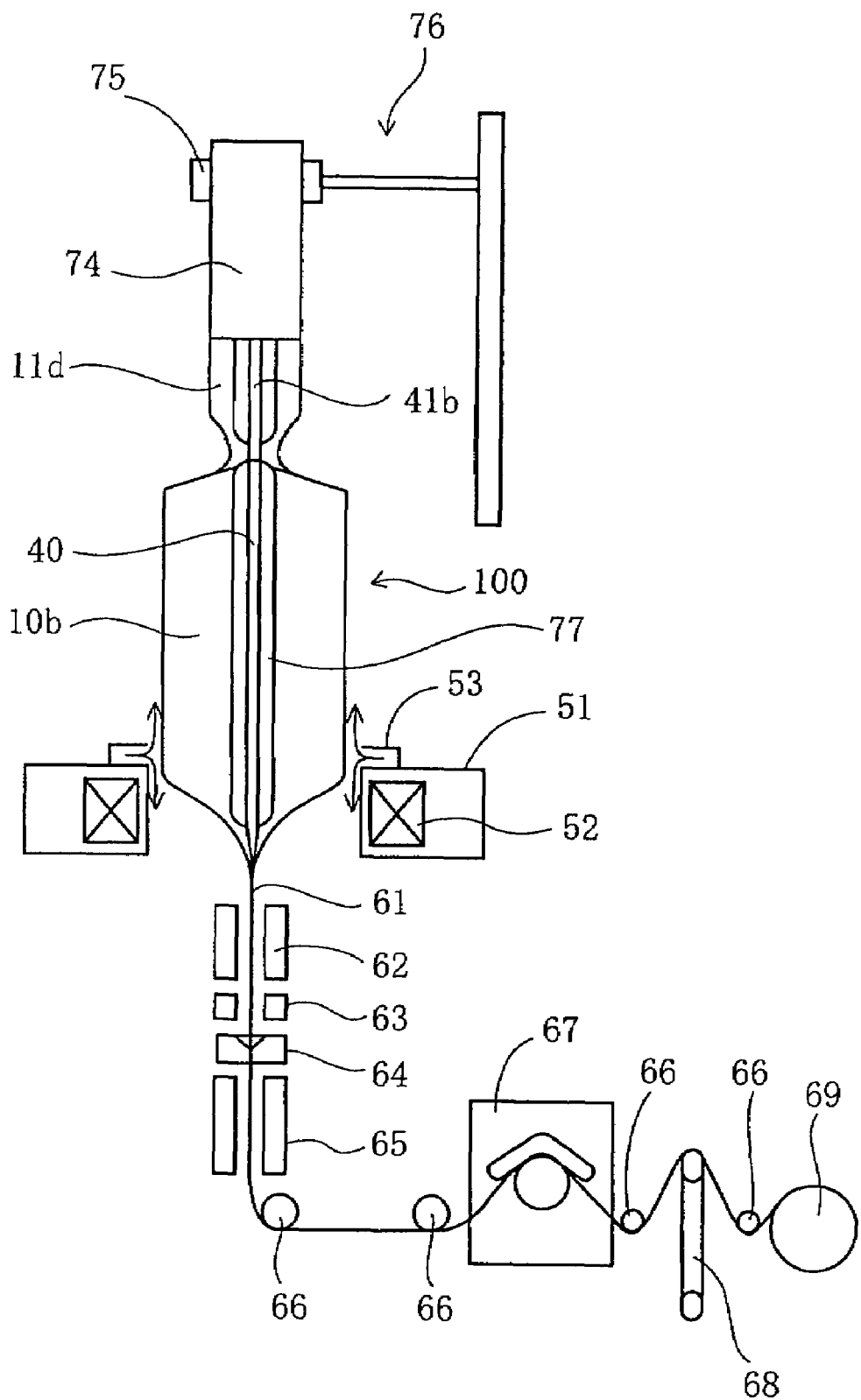
FIG. 23 is a view showing an example of rod-in-drawing of the third embodiment of the present invention.

As shown in FIG. 23, the optical fiber 61 is drawn from the bottom end of the optical fiber preform 100 by the capstan 67 while the bottom end of the cladding pipe 10b is collapsed and unified with the core rod 40 by heating the heating portion 52 of the fiber-drawing furnace 51. The unification by collapse of the cladding pipe is the same as that in the first embodiment, and the heat distribution in the heating portion of the fiber-drawing furnace is determined in the same manner as that in the first embodiment. A space 77 between the core rod and the cladding pipe is decompressed to 1 kPa or less and is closed, and hence the collapse of the cladding pipe 10b can smoothly be performed.

As the drawing of the optical fiber preform 100 proceeds, the size of the space 77 is decreased, and the pressure therein is continuously increased. In the case where the supporting member 41b and the supporting pipe 11d are unified together, the space 77 consists of a space in the non-effective portion located at the top end of the optical fiber preform and a space between the supporting member 41b and the supporting pipe 11d at the stage when the drawing of the effective portion of the optical fiber preform 100 is completed. The pressure of the space to be set when the top end of the cladding pipe is closed is calculated beforehand so that the pressure of the space existing at the completion of the fiber-drawing may be lower than an external pressure existing around the optical fiber preform 100, and when the top end of the cladding pipe is closed, the space is made to have such calculated value of pressure. The portion at which the supporting member and supporting pipe are unified with each other may be provided at a distance from the cladding pipe 10b such that the space existing at the completion of fiber-drawing has a sufficient volume.

In a gas seal method shown in FIG. 23, in order to prevent a gas outside the fiber-drawing furnace 51 from entering the fiber-drawing furnace 51, a gas is jetted to the optical fiber preform 100 from the gas supply portion 53 which is provided on the fiber-drawing furnace 51; however, the entire optical fiber preform may be placed in a container, and an inside-furnace atmosphere and an outside-furnace atmosphere may be separated at a position of the supporting pipe or the extension member. Depending on the heating source to be used, the inside-furnace atmosphere and the outside-furnace atmosphere need not always be separated.

The preform feed device 76 is moved downward so that the optical fiber preform 100 is fed into the fiber-drawing furnace 51. As the optical fiber preform 100 is fed into the fiber-drawing furnace 51, the cladding pipe 10b and the core rod 40 are gradually unified with each other, and simultaneously, the optical fiber 61 is drawn from the unified portion by the capstan 67. As in the case of the first embodiment, the optical fiber 61 drawn out of the fiber-drawing furnace 51 is allowed to pass through the cooling device 62, the external-diameter measurement device 63, the resin-coating device 64, and the resin-curing device 65, is then laid on the path line composed of the guide rollers 66, the capstan 67, and the accumulator 68, and is finally taken up by the winding device 69.

In the third embodiment, it is unnecessary to provide a pipe for exhausting a gas in the space between the core rod and the cladding pipe and a pipe for connecting the space to a dry-gas atmosphere during fiber-drawing of an optical fiber preform. Accordingly, there is no problem of positional arrangement of the pipes when the optical fiber preform is fed into the fiber-drawing furnace by the preform feed device, and hence the optical fiber preform can easily be positioned. In addition, a conventional fiber-drawing furnace used for a solid optical fiber preform can be used without any modification.

The optical fiber obtained in the first and the third embodiments has only one boundary which is formed when the rod and the pipe are unified with each other by heating, and the light transmission loss at a wavelength of 1.38 µm can be decreased to 0.5 dB/km or less and further to 0.35 dB/km or less. These values correspond to an OH group absorption loss of approximately 0.25 dB/km or less and approximately 0.1 dB/km or less, respectively, at a wavelength of 1.38 µm. The boundary is present in the region in which a ratio p1/r1 is 1 to less than 2, where p1 is a distance from the center of the core to the boundary and r1 is a radius of the core.

In addition, the polarization mode dispersion (PMD) can be decreased to 0.15 ps/km$^{1/2}$ or less and further decreased to 0.08 ps/km$^{1/2}$ or less. The absolute value of the variation in dispersion value in the lengthwise direction can be decreased to 2 ps/nm/km$^2$ or less and further decreased to 0.5 ps/nm/km$^2$ or less. The core eccentricity is also 0.3% or less.

<Core Rod>

The ratio D/d of the diameter D of the core rod to the diameter d of the core portion is preferably set such that $1 \leq D/d < 2$ holds. When this relationship is satisfied, a major portion of the optical cladding portion which would have been synthesized as a part of the core rod in the past is synthesized as a cladding pipe. Accordingly, reduction in manufacturing cost and manufacturing time can be achieved. A flame polishing step performed for the core rod can also be omitted. When the ratio D/d is in the range of 1 to 1.4, the first cladding which must be synthesized in the same process as that for the core may only have a volume approximately equivalent to that of the core, and hence the effect is significant in view of productivity.

The core rod may be made of, for example, pure silica itself, a material composed of pure silica and germanium oxide ($GeO_2$) added thereto, or a material composed of pure silica and an additive for increasing the refractive index, such as $P_2O_5$, $Al_2O_3$, $TiO_2$, or Cl, added thereto.

By providing the external circumferential portion of the core rod with a part of an optical cladding which has a composition approximately equivalent to that of the internal surface portion of the cladding pipe, it is possible to suppress the deformation of the core rod or the cladding pipe or the generation of bubbles at the interface can be suppressed when the core rod and the cladding pipe are heated. Accordingly, an optical fiber having superior properties in terms of transmission loss, PMD, dispersion property (variation of dispersion value of an optical fiber in the lengthwise direction), and the like, can be manufactured.

In the case where an additive such as $GeO_2$ is added to the core, and pure silica is used for the cladding, by providing a part of an optical cladding made of pure silica around the core rod, the core rod and the cladding can be unified with each other such that the concentricity thereof is maintained during heating. Accordingly, the occurrence of noncircularity or eccentricity of the core can be suppressed. Furthermore, since the amount of the optical cladding present in the core rod is small as compared to that in the past, the manufacturing cost can be reduced. Provided that the ratio D/d is 1.2 or less, the optical cladding can be formed in a manner such that a glass particle-deposit body composed only of $GeO_2$-added glass particles is manufactured and germanium present at the external circumferential portion thereof is caused to diffuse or evaporate during the dehydration and vitrification of the glass particle-deposit body.

<Cladding Pipe>

The refractive index in the vicinity of the internal surface of the cladding pipe may desirably be substantially equivalent to that of the first cladding of the core rod, and the cladding pipe may be made of, for example, pure silica to which an additive such as fluorine or $B_2O_3$ is added for decreasing the refractive index; pure silica itself or pure silica to which an additive such as $GeO_2$, $P_2O_5$, $Al_2O_3$, $TiO_2$, or Cl is added for increasing the refractive index. It is more preferable that the composition in the vicinity of the internal surface of the cladding pipe be the same as that of the first cladding.

<Magnification of Pipe>

The ratio D2/d2 of a cladding pipe in terms of the external diameter D2 to the internal diameter d2 thereof is in the range of 5 to 30, desirably more than 7 to 30, and more desirably 8 to 30. In addition, the external diameter is desirably 90 mm or more, more desirably 120 mm or more, and even more desirably 140 mm or more. The length is desirably 500 mm or more and more desirably 600 mm or more. The use of such a large cladding pipe allows an optical fiber produced by one drawing operation to have a more elongated length, and hence the productivity is improved. The ratio of the external diameter of the cladding pipe to the internal diameter thereof is appropriately adjusted in accordance with the structure of a desired optical fiber.

<Eccentricity>

The eccentricity of the core rod and the cladding pipe is desirably 0.3% or less, and more desirably 0.2% or less, over the entire length thereof. As used herein, the term "eccentricity" in the case of the core rod having the first cladding is the value that can be obtained by dividing the amount of displacement between the center of the core portion and the center of the core rod by the diameter of the core rod. The eccentricity of the cladding pipe is determined in terms of the relation of the internal circumference to the external circumference and is the value obtained by dividing the amount of displacement between the center of the internal diameter of the pipe and the center of the external diameter thereof by the external diameter. Thus, not only can the amount of core eccentricity of the optical fiber finally obtained be decreased, but also the unevenness of a molten state in the cross-section perpendicular to the axis can be decreased when the core rod and the cladding pipe are unified with each other, whereby the generation of bubbles and noncircularity of the core can be suppressed. As a result, the transmission properties of the optical fiber thus obtained can be made superior.

<Noncircularity of Pipe>

The noncircularity of the core and first cladding of a core rod as well as the noncircularity of the external diameter and internal diameter of a cladding pipe is preferably 1.5% or less, respectively. Those having a noncircularity of 0.5% or less are more desirably used, and those having a noncircularity of 0.2% or less are further more desirable. The rod-in-drawing of a core rod or a cladding pipe having a small noncircularity enables an optical fiber in which the degradation in noncircularity of the core and the increase in birefringence index are suppressed and the PMD is decreased. For example, 0.15 $ps/km^{1/2}$ or less can be achieved. In addition, when the core rod and the cladding pipe are unified with each other, the unevenness of a molten state in the cross-section perpendicular to the axis can be decreased, the unification between the core rod and the cladding pipe uniformly proceeds, and the generation of bubbles can be suppressed. Accordingly, the transmission properties of the optical fiber produced therefrom can be made superior. In addition, since the deviation in the wall thickness of the cladding of the optical fiber thus formed is small, that is, since the core is not eccentric, the loss caused by splicing of the optical fiber is low. When a core rod and a cladding pipe, each having a small noncircularity and eccentricity, are used in combination, the effect described above can be further enhanced.

A core rod having a surface roughness of 20 μm or less and a cladding pipe having an internal surface roughness of 20 μm or less are preferably used. Accordingly, when the core rod and the cladding pipe are unified with each other, the generation of bubbles can effectively be suppressed since the roughness of their surfaces to be welded together are small. Hence, the fiber breakage and the variation in diameter which occur in fiber drawing can be suppressed. In addition, the transmission loss of the optical fiber to be formed can be decreased. The surface roughness can be decreased by drawing the rod or the pipe so as to have a predetermined diameter by the use of heating means such as a resistance heating furnace or an induction heating furnace, or by removing an impurity-containing layer of the surface by immersion in a hydrogen fluoride aqueous solution having a concentration of 0.1 to 50 percent by weight for 1 hour or more.

The concentration of OH groups of the core rod is desirably 20 weight ppm or less, more desirably 10 weight ppm or less, more desirably 2 weight ppm or less, more desirably 1 weight ppm or less, and most desirably 0.1 weight ppm or less. As for the cladding pipe, the OH concentration in the portion to be included in a mode field diameter of the optical fiber formed therefrom is desirably 20 weight ppm or less, more desirably 10 weight ppm or less, more desirably 2 weight ppm or less, and more desirably 1 weight ppm or less. By using a core rod and a cladding pipe in which the OH concentration is originally low, an optical fiber having a low light transmission loss due to OH groups can be obtained.

When the OH concentration in the interface between the core and the cladding is 0.05 ppm, the light transmission loss due to OH groups is 0.5 dB. As in the example described above, when a core rod having a small thickness and a cladding pipe having a large thickness are unified with each other by heating, the core rod having a considerably smaller heat capacity than that of the cladding pipe is more liable to be deformed. Accordingly, the average viscosity of the core rod is preferably equivalent to or more than that of the cladding pipe. The reason for this is that the deformation of the core rod which may otherwise occur during unification can easily be prevented. As a result, bubbles, noncircularity and eccentricity, and the like, in the core of the optical fiber thus obtained are unlikely to occur. In this case, the values of viscosity to be used for comparison are representative values of viscosity in the temperature region in which the two described above are unified by fusion, and in the case of a silica base glass, the temperature range is generally 1,000° C. to 2,400° C. Herein, the value at a temperature of 1,200° C. is regarded as the representative value.

The examples of glass for forming a core and a cladding which can achieve the combination of viscosities as described above include the following. That is, for forming the core, a pure silica glass or a silica glass containing at least one of a halogen atom, such as fluorine or Cl, and a metal oxide, such as $GeO_2$, $B_2O_3$, $P_2O_5$, or $Al_2O_3$, is preferable, and for forming the cladding, either a fluorine-containing silica glass or a fluorine-containing silica glass containing at least one of a halogen atom except fluorine and a metal oxide, such as $GeO_2$, $B_2O_3$, $P_2O_5$, or $Al_2O_3$, is desirable. Particularly desirable combinations are as follows: the core is a silica glass containing a Cl atom, or a silica glass containing a Cl atom and a fluorine atom, and the cladding is a fluorine-containing silica glass or a fluorine-containing silica glass containing a Cl atom; or the core is a silica glass containing $GeO_2$ or a silica glass containing $GeO_2$ and a Cl atom, and the cladding is a fluorine-containing silica glass or a fluorine-containing silica glass containing a Cl atom. For example, when the core is a silica glass containing approximately 1,000 weight ppm of Cl atoms, and the cladding is a silica glass containing approximately 1 percent by weight of fluorine atoms, the relationship of the viscosity between the core and the cladding described above is satisfied, and in addition, a relative refractive index difference of approximately 0.34% can be obtained. In addition to this example, the types of additives and the amounts thereof are appropriately selected and adjusted to obtain predetermined viscosities of the core and the cladding and a predetermined relative refractive index difference therebetween.

<Refractive Index Profile>

The refractive index profile of an optical fiber is not particularly limited. A core rod having a complicated refractive index profile as in a dispersion shifted fiber or a dispersion compensation fiber can also be used. In the case in which a single mode optical fiber having a simple step type refractive index profile is to be formed, a typical single mode optical fiber can be formed if the relative refractive index difference of the core relative to the cladding is 0.2% or more.

In the case where a core rod having a first cladding provided around a portion corresponding to the core is used, the refractive index in the region from the inner surface of the cladding pipe to a depth of one-tenth of the thickness thereof is preferably substantially equivalent to that of the first cladding portion. That is, the relative refractive index difference between the above two is in the range of −0.05% to +0.05% and more desirably in the range of −0.02% to +0.02%. Accordingly, an optical fiber having small variation in properties such as a cut-off wavelength and dispersion can be obtained.

In the case of the core rod having a first cladding, in order to enable the first cladding and the cladding formed therearound to have refractive indexes in a predetermined range, types of additives and the concentrations thereof, which are to be added for controlling the refractive index, are adjusted. The adjustment described above includes the case in which no additive is used. A cladding portion containing the first cladding may have a plurality of regions having different refractive indexes. In addition, in the above example, the single mode optical fiber is primarily described; however, the present invention may also be applied to a multimode optical fiber, and the same effect of decreasing the transmission loss as described above can also be obtained.

EXAMPLES

In accordance with the third embodiment, optical fibers were manufactured by rod-in-drawing under the conditions shown in Table I (Examples 1 to 4). To be more precise, a cladding pipe was immersed in a hydrogen fluoride aqueous solution for washing, the cladding pipe and a supporting pipe were connected to each other, and the internal surface of the cladding pipe was subjected to vapor-phase etching, followed by a chlorine treatment of the internal surface of the cladding pipe. Next, a baking treatment was performed by heating the surface of the core rod and the internal surface of the cladding pipe to a pipe internal surface temperature Tb while a space between the core rod and the cladding pipe was maintained at a dew point of Td° C. In a second substep of the baking step, a dry chlorine gas was caused to flow. Next, the bottom end (downstream side with respect to the gas flow) of the cladding pipe was closed, the top end (upstream side with respect to the gas flow) was then closed to form an optical fiber preform while the inside of the cladding pipe was maintained at a pressure of P kPa, and flame polishing was then performed for the external surface of the optical fiber preform. Subsequently, by drawing this optical fiber preform, an optical fiber was manufactured. In Example 2, the core rod was separated into two pieces, and they were inserted into the cladding pipe from the end thereof at the downstream side with respect to the gas flow.

TABLE I

| Example | 1 | 2 | 3 | 4 |
|---|---|---|---|---|
| External Diameter of Supporting Pipe mm | 100 | 40 | 125 | 40 |
| Length of Supporting Pipe mm | 1,500 | 1,500 | 1,500 | 1,500 |
| External Diameter of Cladding Pipe mm | 150 | 70 | 250 | 36 |
| Length of Cladding Pipe mm | 700 | 2,500 | 300 | 2,000 |
| Diameter of Core Rod mm | 10 | 4.5 | 16 | 2.4 |
| Length of Core Rod mm | 700 | 1,300 + 1,300 | 400 | 2.100 |
| Baking Temperature Tb ° C. | 450 | 400 | 350 | 500 |
| Baking Time Hour | 1 | 2 | 4 | 0.5 |
| Dew point Td ° C. | −88 | −80 | −59 | −85 |
| Pressure P kPa | 0.1 | 3.2 | 0.01 | 3.6 |
| Holding Time after Closing at Upstream Side Minute | 30 | 10 | 60 | 15 |

In the optical fibers manufactured under condition 1, 2, or 4, a light transmission loss of 0.1 dB/km or less could be obtained at a wavelength of 1.38 µm. In the optical fiber manufactured under condition 3, the light transmission loss at a wavelength of 1.38 µm was 1.2 dB/km and was larger than 0.5 dB/km. This is believed to be due to a dry gas used in the baking step having a high dew point.

The entire disclosures including specifications, claims, figures, and abstracts of Japanese patent Application Nos. 2003-139732 (filed on May 19, 2003) and 2003-139733 (filed on May 19, 2003) are incorporated herein by reference.

INDUSTRIAL APPLICABILITY

An optical fiber having a low transmission loss can be manufactured with superior productivity at a low cost.

The invention claimed is:

1. A method of manufacturing an optical fiber, the method comprising steps of:
   inserting a core rod into a cladding pipe;
   removing moisture present on the surface of the core rod and the internal surface of the cladding pipe;
   closing at least one end of the cladding pipe; and
   while a space formed between the core rod and the cladding pipe is connected to a dry-gas atmosphere and/or is decompressed, heating the core rod and the cladding pipe so as to unify the core rod and the cladding pipe and to draw from the one end of the cladding pipe from the optical fiber, wherein the concentration of hydrogen molecules or a compound containing a hydrogen atom in the dry gas is 10 volume ppm or less in total.

2. A method of manufacturing an optical fiber, the method comprising step of:

inserting a core rod into a cladding pipe;

removing moisture present on the surface of the core rod and the internal surface of the cladding pipe;

closing at least one end of the cladding pipe; and while a space formed between the core rod and the cladding pipe is connected to a dry-gas atmosphere and/or is decompressed, heating the core rod and the cladding pipe so as to unify the core rod and the cladding pipe and to draw from the one end of the cladding pipe to form the optical fiber, wherein a ratio D/d of a diameter D of the core rod to a diameter d of a core portion is in the range of 1 to less than 2, the core rod is only composed of the core portion, and the relative refractive index difference of the core rod to the cladding pipe is 0.2% or more.

3. A method of manufacturing an optical fiber, the method comprising steps of:

inserting core rod into a cladding pipe;

removing moisture present on the surface of the core rod and the internal surface of the cladding pipe;

closing at least one end of cladding pipe; and while a space formed between the core rod and the cladding pipe is connected to a dry-gas atmosphere and/or is decompressed, heating the core rod and the cladding pipe so as to unify the core rod and the cladding pipe and to draw from the one end of the cladding pipe to form the optical fiber, wherein a ratio D/d of a diameter D of the core rod to a diameter d of a core portion is in the range of 1 to less than 2, to core rod is composed of the core portion and a first cladding portion having a refractive index smaller than that of the core portion, the relative refractive index difference of the core portion to the first cladding portion 0.2% or more, and the refractive index of the first cladding portion is preferably substantially equivalent to that of a region from the inner surface of the cladding pipe to a depth of one-tenth of the thickness of the cladding pipe.

4. A method of manufacturing an optical fiber, the method comprising steps of:

inserting a core rod into a cladding pipe;

removing moisture present on the surface of the core rod and the internal surface of the cladding pipe;

closing at least one end of the cladding pipe; and while a space formed between the core rod and the cladding pipe is connected to a dry-gas atmosphere and/or is decompressed, heating the core rod and the cladding pipe so as to unify the core rod and the cladding pipe and to draw from the one end of the cladding pipe to form the optical fiber, wherein a ratio D2/d2 of an external diameter the cladding pipe to an internal diameter d2 thereof is in the range of 5 to 30, and the length of the cladding pipe is 500 mm or more.

5. The method of manufacturing an optical fiber, according to claim 4, wherein the ratio D2/d2 is in the range of more than 7 to 30.

6. A method of manufacturing an optical fiber, the method comprising steps of:

inserting a core rod into a cladding pipe;

removing moisture present on the surface of the core rod and the internal surface of the cladding pipe;

closing at least one end of the cladding pipe; and while a space formed between the core rod and the cladding pipe is connected to a dry-gas atmosphere and/or is decompressed, heating the core rod and the cladding pipe so as to unify the core rod and the cladding pipe and to draw from the one end of the cladding pipe to form the optical fiber, wherein the eccentricity of the internal circumference of the cladding pipe to the external circumference thereof is 0.3% or less over the entire effective length.

7. An optical fiber comprising a core and a cladding, the cladding being provided around the external circumference of the core and having a refractive index smaller that that of the core, wherein the optical fiber has only one boundary formed on a cross-section perpendicular to the axis thereof, the said boundary being formed as a result of a rod and a pipe being unified with each other by heating, and the optical fiber has a light transmission loss of 0.5 dB/km or less at a wavelength of 1.38 μm.

8. The optical fiber according to claim 7, wherein a ratio p1/r1 of a distance p1 from center of the core to the boundary to a radius r1 of the core is in the range of 1 to less than 2.

9. The optical fiber according to claim 7, wherein the relative refractive index difference of the core to a first cladding is 0.2% or more, the first cladding being a portion frown said boundary to the core, and wherein the refractive index of the first cladding is substantially equivalent to the refractive index of a portion between said boundary and a circle having a radius of r+2t, the circle being concentric to the center of the core, and the thickness of the first cladding being represented by t.

10. The optical fiber according to claim 7, wherein the average viscosity of the core at 1,200° C. is equivalent to or more than the average viscosity of the cladding.

11. The optical fiber according to claim 7, wherein the core is made of a pure silica glass or a silica glass containing an additive, and the cladding is made of a glass primarily composed of a fluorine-containing silica glass.

12. A method of manufacturing an optical fiber, the method comprising steps of:

inserting a core rod into a cladding pipe;

closing at least one end of the cladding pipe; and while a space formed between the core rod and the cladding pipe is connected to a dry-gas atmosphere, heating the cow rod and the cladding pipe so as to remove moisture adhering to a surface of the core rod and an internal surface of the cladding pipe, to unify the core rod and the cladding pipe and to draw from the one end of the cladding pipe to form the optical fiber, wherein the concentration of hydrogen molecules or a compound containing a hydrogen atom in the dry gas is 10 volume ppm or less in total.

13. A method of manufacturing an optical fiber, the method comprising the steps of:

inserting a core rod into a cladding pipe;

closing at least one end of the cladding pipe; and while a space formed between the core rod and the cladding pipe is connected to a dry-gas atmosphere, heating the core rod and the cladding pipe so as to remove moisture adhering to a surface of the core rod and an internal surface of the cladding pipe, to unify the core rod and the cladding pipe arid to draw from the one end of the cladding pipe to form the optical fiber, wherein a ratio D/d of a diameter D of tile core rod to a diameter d of a core portion is in the range of 1 to less than 2, the core rod is only composed of the core portion, and the relative refractive index difference of the core rod to the cladding pipe is 0.2% or more.

14. A method of manufacturing an optical fiber, the method comprising the steps of:

inserting a core rod into a cladding pipe;

closing at least one end of the cladding pipe; and while a space formed between the core rod and the cladding pipe is connected to a dry-gas atmosphere, heating the cure rod and the cladding pipe so as to remove moisture adhering to a surface of the core rod and an internal surface of the cladding pipe, to unify the core rod and the cladding pipe and to draw from the one end of the cladding pipe to from the optical fiber, wherein a ratio D/d of a diameter D of the core rod to a diameter d of a core portion is in the range of 1 to less than 2.

the core rod is composed of the core portion and a first cladding portion having a refractive index smaller than that of the core portion, the relative refractive index difference of the core portion to the first cladding portion is 0.2% or more, and the refractive index of the first cladding portion is preferably substantially equivalent to that of a region born the inner surface of the cladding pipe to as depth of one-tenth of the thickness of the cladding pipe.

15. A method of manufacturing an optical fiber, the method comprising the steps of:

inserting a core rod into a cladding pipe;

closing at least one end of the cladding pipe; and while a space formed between the core rod and the cladding pipe is connected to a dry-gas atmosphere, heating the core rod and the cladding pipe so as to remove moisture adhering to a surface of the core rod and an internal surface of the cladding pipe to unify the core rod and the cladding pipe and to draw from the one end of the cladding pipe to form the optical fiber, wherein a ratio D2/d2 of an external diameter D2 of the cladding pipe to an internal diameter d2 thereof is in the range of 5 to 30, and the length of the cladding pipe is 500 mm or more.

16. The method of manufacturing an optical fiber, according to claim 15, wherein the ratio D2/d2 is in the range of more than 7 to 30.

17. A method of manufacturing an optical fiber, the method comprising the steps of:

inserting a core rod into a cladding pipe;

closing at least one end of the cladding pipe; and while a space formed between the core rod and the cladding pipe is connected to a dry-gas atmosphere, heating the core rod and the cladding pipe so as to remove moisture adhering to a surface of the core rod and an internal surface of the cladding pipe, to unify the core rod and the cladding pipe and to draw from the one end of the cladding pipe to form the optical fiber, wherein the eccentricity of the internal circumference of the cladding pipe to the external circumference thereof is 0.3% or less over the entire effective length.

* * * * *

UNITED STATES PATENT AND TRADEMARK OFFICE
CERTIFICATE OF CORRECTION

PATENT NO. : 7,486,862 B2
APPLICATION NO. : 10/556946
DATED : February 3, 2009
INVENTOR(S) : Yuichi Ohga et al.

It is certified that error appears in the above-identified patent and that said Letters Patent is hereby corrected as shown below:

Column 29, Line 3 (Claim 1), change "pipe from the" to --pipe to form the--;

Line 39 (Claim 3), change "to core rod" to --the core rod--;

Line 44, change "portion 0.2%" to --portion is 0.2%--;

Line 61 (Claim 4), change "diameter the" to --diameter D2 of the--;

Column 30, Line 27 (Claim 8), change "from center" to --from the center--;

Line 33 (Claim 9), change "portion frown" to --portion from--;

Line 56 (Claim 12), change "cow rod" to --core rod--;

Column 31, Line 6 (Claim 13), change "pipe arid" to --pipe and--;

Line 8, change "of tile core" to --of the core--;

Line 19 (Claim 14), change "cure rod" to --core rod--;

Line 23, change "to from the" to --to form the--;

Line 32, change "region born the" to --region from the--;

Line 33, change "to as depth" to --to a depth--; and

UNITED STATES PATENT AND TRADEMARK OFFICE
CERTIFICATE OF CORRECTION

PATENT NO. : 7,486,862 B2
APPLICATION NO. : 10/556946
DATED : February 3, 2009
INVENTOR(S) : Yuichi Ohga et al.

It is certified that error appears in the above-identified patent and that said Letters Patent is hereby corrected as shown below:

Column 32, Line 9 (Claim 15), change "pipe to" to --pipe, to--.

Signed and Sealed this

Twenty-eighth Day of April, 2009

JOHN DOLL
*Acting Director of the United States Patent and Trademark Office*